(12) United States Patent  
Sato et al.

(10) Patent No.: US 11,400,841 B2  
(45) Date of Patent: Aug. 2, 2022

(54) VEHICLE SEAT

(71) Applicant: TS TECH CO., LTD., Asaka (JP)

(72) Inventors: Kohei Sato, Tochigi (JP); Takayoshi Ito, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 98 days.

(21) Appl. No.: 16/767,045

(22) PCT Filed: Nov. 21, 2018

(86) PCT No.: PCT/JP2018/043006  
§ 371 (c)(1),  
(2) Date: May 26, 2020

(87) PCT Pub. No.: WO2019/103043  
PCT Pub. Date: May 31, 2019

(65) Prior Publication Data  
US 2021/0031657 A1    Feb. 4, 2021

(30) Foreign Application Priority Data

Nov. 27, 2017   (JP) .............................. JP2017-226769  
Nov. 27, 2017   (JP) .............................. JP2017-226860  
Nov. 27, 2017   (JP) .............................. JP2017-226877

(51) Int. Cl.  
*H05B 1/02*       (2006.01)  
*B60N 2/56*       (2006.01)  
(Continued)

(52) U.S. Cl.  
CPC ........... *B60N 2/5685* (2013.01); *H05B 3/342* (2013.01); *B60R 16/03* (2013.01)

(58) Field of Classification Search  
CPC .............. B60N 2/5685; B60N 2/5678; H05B 2203/029; H05B 1/0238; H05B 1/02  
See application file for complete search history.

(56) References Cited

U.S. PATENT DOCUMENTS 8,544,942 B2 * 10/2013 Lazanja ................ H05B 1/028  
297/180.12  
8,702,164 B2 *  4/2014 Lazanja ................ H01C 17/06  
297/180.12  
(Continued)

FOREIGN PATENT DOCUMENTS

JP      H05029656       2/1993  
JP      3013387 U       7/1995  
(Continued)

OTHER PUBLICATIONS

Extended European Search Report issued for European Patent Application No. 18881788.6, dated Jan. 12, 2021, 3 pages.  
(Continued)

*Primary Examiner* — Shin H Kim  
(74) *Attorney, Agent, or Firm* — Hamre, Schumann, Mueller & Larson, P.C.

(57) ABSTRACT

A vehicle seat includes a first heater which heats a first region, a second heater which heats a second region different from the first region, and a controller connected to the first heater and the second heater. The controller is capable of executing PWM control under which current applied to the first heater and the second heater is regulated by setting current-application timeframes within a unit time period, wherein a first current-application timeframe that is a period within the unit time period in which current is applied to the first heater and a second current-application timeframe that is a period within the unit time period in which current is applied to the second heater, as set under the PWM control, are shifted relative to each other when current is applied to the first heater and the second heater.

7 Claims, 16 Drawing Sheets

(51) Int. Cl.
*H05B 3/34* (2006.01)
*B60R 16/03* (2006.01)

(56) References Cited

U.S. PATENT DOCUMENTS

| | | | | |
|---|---|---|---|---|
| 8,704,477 | B2* | 4/2014 | Brown | F04D 27/004 318/473 |
| 8,752,891 | B2* | 6/2014 | Yoshimoto | H05B 3/34 297/180.12 |
| 8,939,501 | B2 | 1/2015 | Nishikawa et al. | |
| 9,497,801 | B2* | 11/2016 | Nishikawa | B60N 2/5685 |
| 9,657,963 | B2* | 5/2017 | Lazanja | B60N 2/5685 |
| 10,179,526 | B2 | 1/2019 | Marquette et al. | |
| 10,259,360 | B2* | 4/2019 | Sato | B60N 2/5678 |
| 10,850,653 | B2* | 12/2020 | Sato | A47C 7/748 |
| 11,155,190 | B2* | 10/2021 | Furui | B60N 2/5685 |
| 2005/0007406 | A1* | 1/2005 | Haas | H05B 1/02 347/17 |
| 2007/0013213 | A1* | 1/2007 | Axinte | B60N 2/5685 297/180.12 |
| 2011/0226751 | A1 | 9/2011 | Lazanja et al. | |
| 2012/0049586 | A1* | 3/2012 | Yoshimoto | A47C 7/748 297/180.12 |
| 2013/0098891 | A1 | 4/2013 | Chiu et al. | |
| 2013/0106147 | A1* | 5/2013 | Lazanja | A47C 7/748 297/180.12 |
| 2013/0319991 | A1* | 12/2013 | Nishikawa | H05B 1/0238 219/217 |
| 2014/0197155 | A1 | 7/2014 | Takahashi et al. | |
| 2016/0332549 | A1 | 11/2016 | Marquette et al. | |
| 2018/0118064 | A1* | 5/2018 | Sato | B60N 2/002 |
| 2019/0210495 | A1* | 7/2019 | Sato | B60N 2/5685 |
| 2021/0078472 | A1* | 3/2021 | Sato | B60N 2/5678 |

FOREIGN PATENT DOCUMENTS

| | | |
|---|---|---|
| JP | 2007114122 | 5/2007 |
| JP | 2010036751 | 2/2010 |
| JP | 2012148007 | 8/2012 |
| JP | 2012224122 | 11/2012 |
| JP | 2014136462 | 7/2014 |
| JP | 2015207560 | 11/2015 |
| JP | 2015225738 | 12/2015 |
| JP | 2016185760 | 10/2016 |
| JP | 2016210414 | 12/2016 |
| JP | 2017157279 | 9/2017 |
| WO | 2010137290 | 12/2010 |
| WO | 2011114682 | 9/2011 |

OTHER PUBLICATIONS

International Search Report issued for International Patent Application No. PCT/JP2018/043006, dated Feb. 26, 2019, 5 pages including English translation.

Written Opinion issued for International Patent Application No. PCT/JP2018/043006, dated Feb. 26, 2019, 13 pages including English translation.

Office Action issued for Japanese Patent Application No. 2017-226860, Dispatch Date: Aug. 10, 2021, 7 pages including English translation.

Office Action issued for Japanese Patent Application No. 2017-226877, Dispatch Date: Aug. 10, 2021, 9 pages including English translation.

Office Action issued for Chinese Patent Application No. 201880076809.9, dated Dec. 3, 2021, 15 pages including English translation.

* cited by examiner

FIG.2
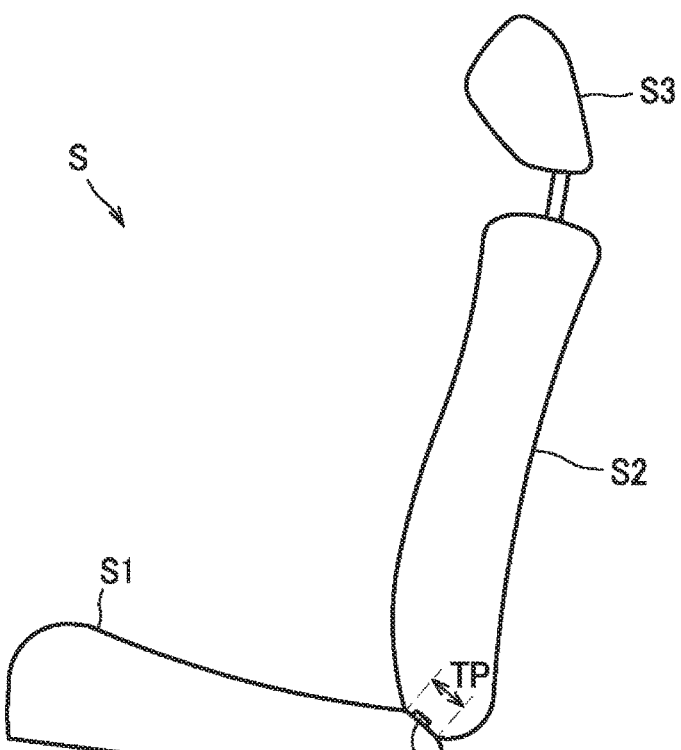
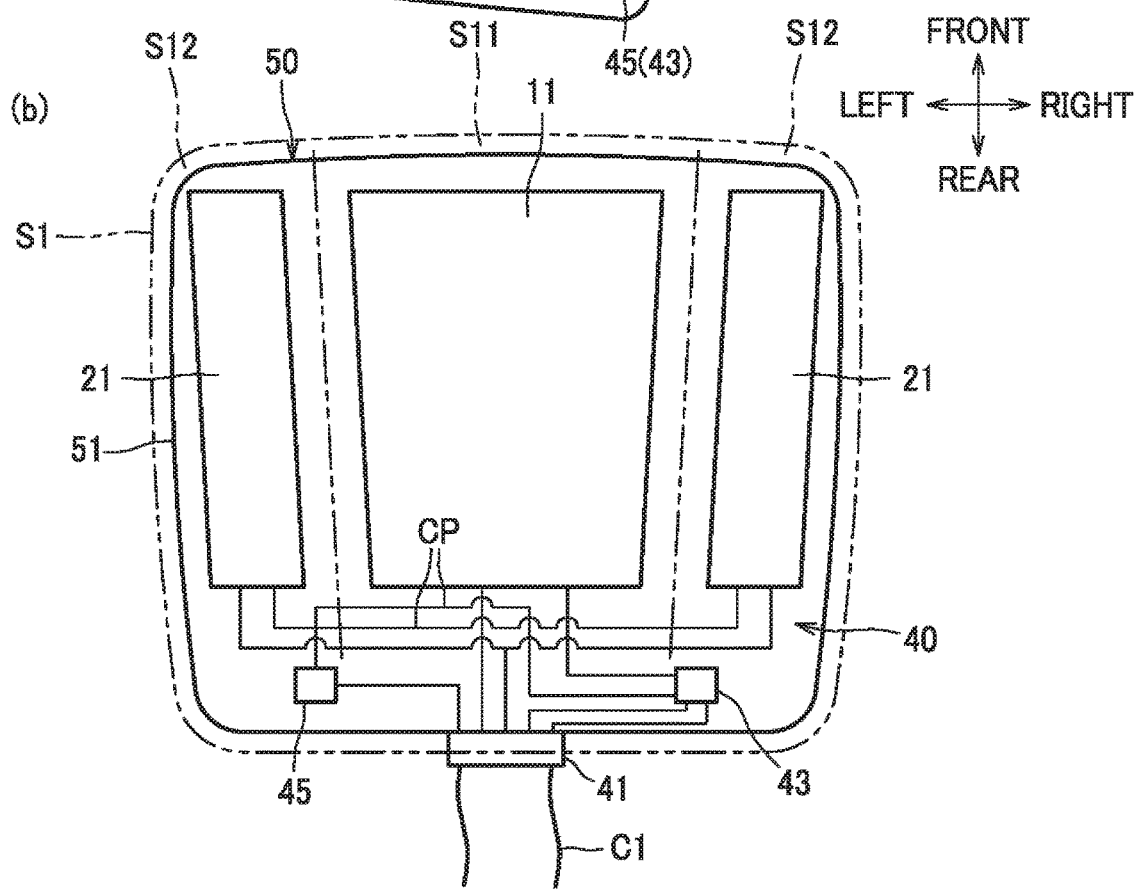

FIG.3
(a)
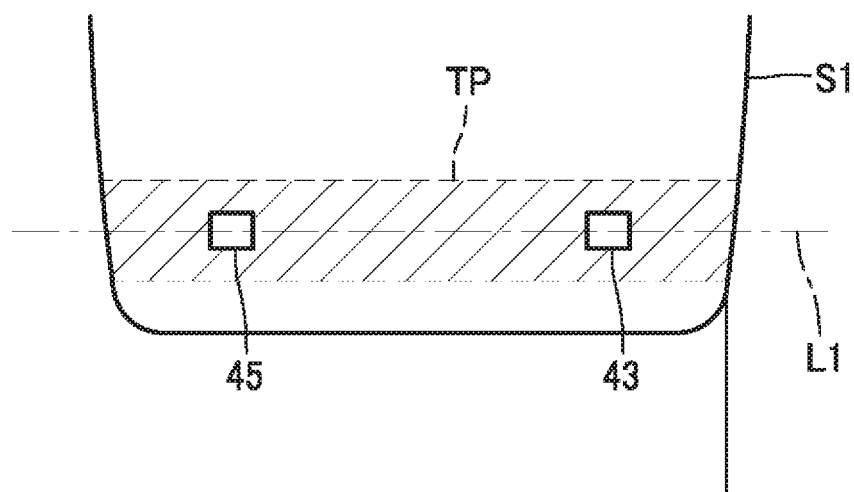
(b)
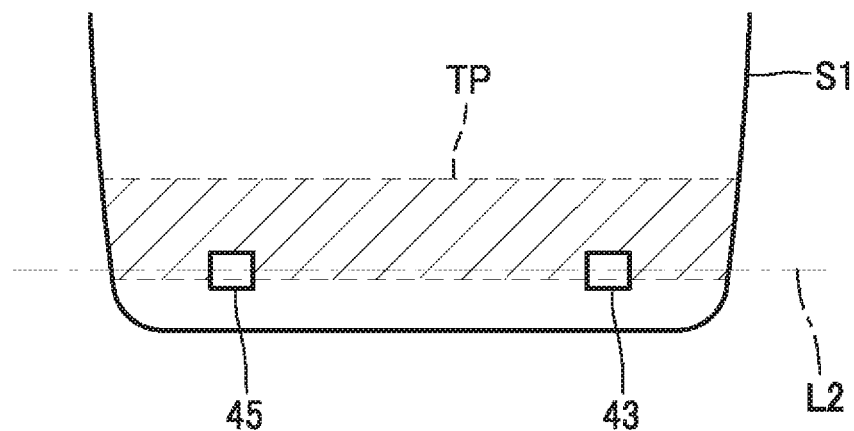

FIG.5
(a) SEAT SURFACE PORTION HEATING PROCESS
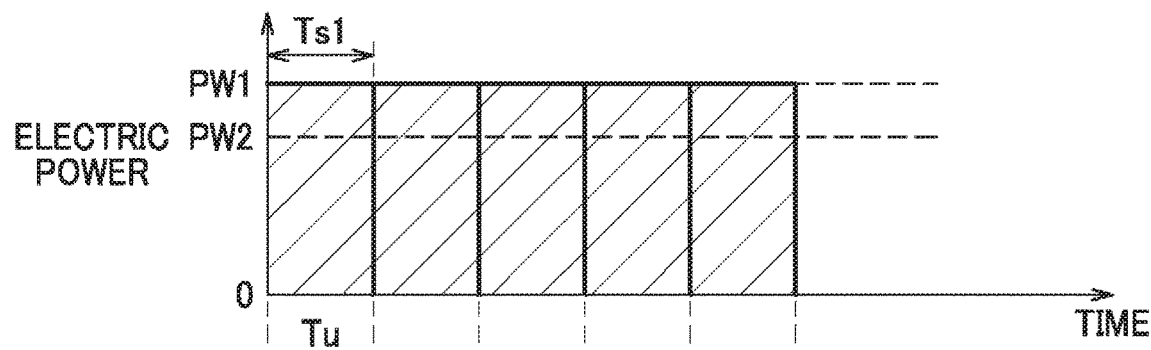
(b) PROJECTING PORTION HEATING PROCESS
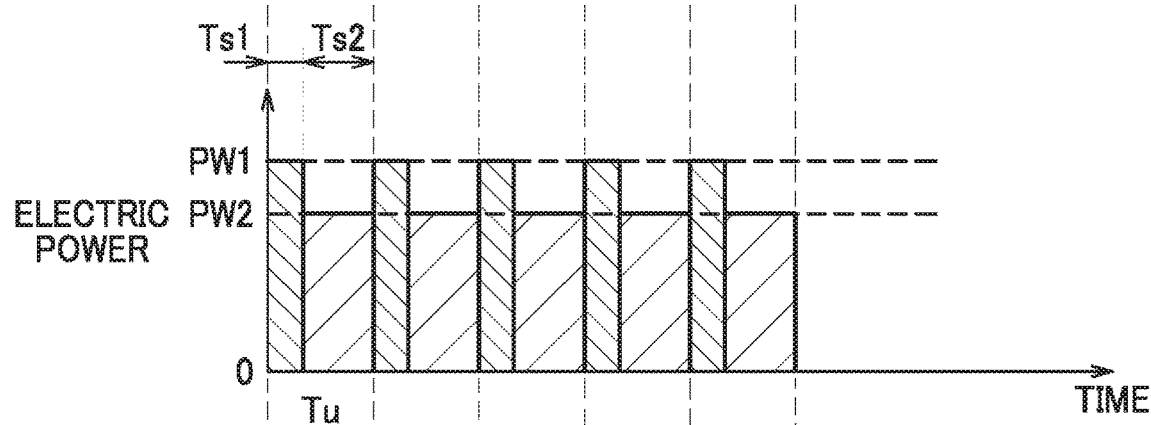
(c) FEEDBACK PROCESS
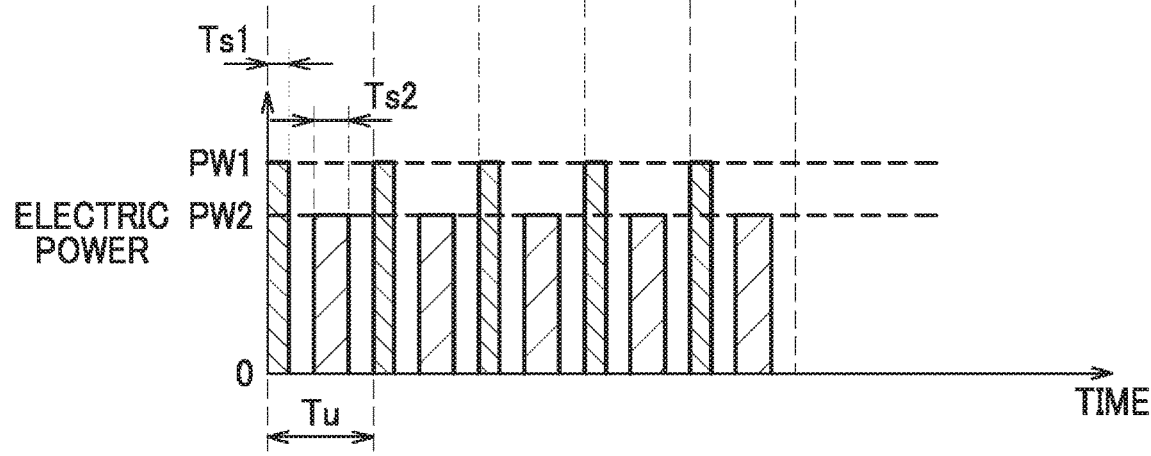

VEHICLE SEAT

TECHNICAL FIELD

The present invention relates to a vehicle seat including a heater capable of heating a seat surface.

BACKGROUND ART

Conventionally, a vehicle seat including a plurality of heaters which are configured to heat a plurality of regions of a seat cushion and a seat back is known in the art (Japanese Laid-Open Patent Application Publication No. 2016-185760).

Further, conventionally, a vehicle seat including a heater and a controller which is configured to control the heater is known in the art (Japanese Laid-Open Patent Application Publication No. 2017-157279).

Additionally, the seat disclosed in Japanese Laid-Open Patent Application Publication No. 2016-185760 includes a planar heater (a planar heating element) capable of heating a seat surface. In such seat, the planar heating element is arranged between a pad and a covering. The heater is provided in a seat surface portion in a laterally central position of the seat and in projecting portions which project toward an occupant side on left and right sides of the seat surface portion.

Between the seat surface portion and each projecting portion, there is provided a tuck-in groove for tucking in a covering of the seat. The coverings of the seat surface portion and the projecting portions are provided with plastic cords for providing rigidity to their seam portions and these plastic cords are positioned in the tuck-in grooves. Each plastic cord is hooked onto a metal wire provided on the bottom of the grooves by C-shaped members, hooks or hook-and-loop fasteners or the like.

SUMMARY OF INVENTION

Problem to be Solved by the Invention

In a vehicle seat including a plurality of heaters such as disclosed in Japanese Laid-Open Patent Application Publication No. 2016-185760, there is a problem that peak power increases when current is applied to the plurality of heaters at the same time.

Thus, it is a first object to suppress peak power in a vehicle seat including a plurality of heaters.

Further, in a vehicle seat including a heater, as disclosed in Japanese Laid-Open Patent Application Publication No. 2017-157279, it is desired to connect a thermostat to the heater, which mechanically interrupts application of current to the heater so that excess current does not flow to the heater. However, in the case a plurality of heaters are provided in the vehicle seat, a thermostat must be individually provided for each heater and the problem of high cost arises.

Consequently, it is a second object to reduce the number of thermostats and thereby lower cost in a vehicle seat including a plurality of heaters.

When a planar heating element of a seat surface portion and a planar heating element of projecting portions are connected, if a connecting portion therebetween is to be placed in a tuck-in groove, it will be necessary to provide a complex configuration, for example, by providing the groove with a deeper portion such that it does not interfere with a plastic cord, or by providing the metal wire bent to follow a bypass route such that the connecting portion is not affected by the metal wire.

Further, a large load may be exerted on the region of the tuck-in groove between the seat surface portion and the projecting portions which extends in the front-rear direction (in the case of a seat cushion) or the up-down direction (in the case of a seat back) by an occupant placing his or her knees or his or her hands thereon. Therefore, if the connecting portion of the heaters is placed in the tuck-in groove, there is a possibility that the connecting portion will be damaged. Particularly, in the case of the seat cushion, there is a large possibility that someone will place his or her knees thereon on such occasions as when cleaning the interior of the car.

It is thus a third object to provide a vehicle seat in which a planar heating element is less susceptible to damage while having a simple structure.

To solve the aforementioned first problem, a vehicle seat including a seat cushion and a seat back comprises a first heater which heats a first region of the seat cushion and the seat back, a second heater which heats a second region of the seat cushion and the seat back, the second region being different from the first region, and a controller connected to the first heater and the second heater. The controller is capable of executing PWM control under which current applied to the first heater and the second heater is regulated by setting current-application timeframes within a unit time period, wherein a first current-application timeframe that is a period within the unit time period in which current is applied to the first heater and a second current-application timeframe that is a period within the unit time period in which current is applied to the second heater, as set under the PWM control, are shifted relative to each other when current is applied to the first heater and the second heater.

By this configuration, since the first current-application timeframe that is a period in which current is applied to the first heater and the second current-application timeframe that is a period in which current is applied to the second heater are shifted relative to each other, peak power can be suppressed. Further, since the first current-application timeframe and the second current-application timeframe are shifted within a unit time period of PWM control, a fine adjustment in control can be made so that each region can be efficiently heated.

At least one of the seat cushion and the seat back may comprise a seat surface portion arranged in a laterally central position and projecting portions arranged on left and right sides of the seat surface portion, the projecting portions projecting toward an occupant side to support sides of an occupant, and the first region may consist of the seat surface portion and the second region may consist of the projecting portions.

According to this configuration, the seat surface portion and the projecting portions can be efficiently heated.

The vehicle seat may be configured to further comprise a temperature sensor which detects a temperature of the seat surface portion, wherein the controller is configured to: execute a seat surface portion heating process in which current is provided only to the first heater upon receiving a command to heat the vehicle seat; execute, after the seat surface portion heating process, a projecting portion heating process in which the first current-application timeframe and the second current-application timeframe are set such that a sum of time periods of the first current-application timeframe and the second current-application timeframe is equal to the unit time period; and execute, after the projecting portion heating process, a feedback process in which the first current-application timeframe and the second current-application timeframe are set based on a detected temperature acquired from the temperature sensor, and wherein, in the projecting portion heating process, one of the first current-application timeframe and the second current-application timeframe is set to have a duration longer than a duration of the other of the first current-application timeframe and the second current-application timeframe.

According to this configuration, since, in the projecting portion heating process, the first current-application timeframe and the second current-application timeframe are set such that a sum of time periods of the first current-application timeframe and the second current-application timeframe is equal to the unit time period, the unit time period can be used as heating time without wasting time.

In the projecting portion heating process, the controller may set the second current-application timeframe to have a duration longer than a duration of the first current-application timeframe.

According to this configuration, in the projecting portion heating process executed after heating the seat surface portion with a higher priority in the seat surface portion heating process, the projecting portions can be heated with a higher priority.

In the projecting portion heating process, the controller may set the first current-application timeframe to have a duration longer than a duration of the second current-application timeframe.

According to this configuration, in the projecting portion heating process executed after heating the seat surface portion with a higher priority in the seat surface portion heating process, the seat surface portion can be heated with a higher priority again, for example, if the temperature of the seat surface portion is lower than a predetermined temperature.

In the seat surface portion heating process, the controller may be configured to measure time after receiving the command until the detected temperature reaches a predetermined temperature, and set an execution time of the projecting portion heating process based on the measured time.

According to this configuration, the execution time of the projecting portion heating process can be set to an appropriate duration.

To solve the aforementioned second problem a vehicle seat including a seat cushion and a seat back comprises a first heater which heats a first region of the seat cushion and the seat back, a second heater which heats a second region of the seat cushion and the seat back, the second region being different from the first region, and a thermostat which shuts down application of current.

The first heater and the second heater are respectively configured to be independently controllable, and the thermostat is arranged on a ground side with respect to the first heater and the second heater.

According to this configuration, it will be possible to reduce cost since it will only be necessary to provide one thermostat for a plurality of heaters.

A connecting portion provided between each of the first heater and the second heater and the thermostat may be sandwiched between support sheets.

According to this configuration, the connecting portion of each heater and the thermostat can be restrained from being short-circuited to the ground.

The vehicle seat described above may comprise a thermistor which detects a temperature of the first heater.

The above-described vehicle seat may comprise a controller which regulates application of current to the first heater and the second heater, wherein the controller is configured to shut down application of current to the first heater or the second heater based on a signal detected at the thermistor.

According to this configuration, in the case excess current is likely to flow to the first heater, it is possible to shut off application of current by the controller based on a signal detected at the thermistor without activating the thermostat.

The seat cushion and the seat back may comprise contacting portions which contact each other, and the thermostat may be arranged to overlap a central position of the contacting portion in a front-rear direction.

According to this configuration, the thermostat arranged on the ground side can be sandwiched and protected between the seat cushion and the seat back.

The seat cushion and the seat back may comprise contacting portions which contact each other, and the thermostat may be arranged such that a central position of the thermostat in the front-rear direction overlaps the contacting portions.

According to this configuration, the thermostat arranged on the ground side can be sandwiched and protected between the seat cushion and the seat back.

The vehicle seat described above may comprise a controller which regulates application of current to the first heater and the second heater, wherein the controller is capable of executing PWM control under which current applied to the first heater and the second heater is regulated by setting current-application timeframes within a unit time period, wherein a first current-application timeframe that is a period within the unit time period in which current is applied to the first heater and a second current-application timeframe that is a period within the unit time period in which current is applied to the second heater, as set under the PWM control, are shifted relative to each other when current is applied to the first heater and the second heater.

According to this configuration, since the first current-application timeframe that is a period in which current is applied to the first heater and the second current-application timeframe that is a period in which current is applied to the second heater are shifted relative to each other, peak power can be suppressed. Further, since the first current-application timeframe and the second current-application timeframe are shifted within a unit time period of PWM control, a fine adjustment in control can be made so that each region can be efficiently heated.

At least one of the seat cushion and the seat back may comprise a seat surface portion arranged in a laterally central position and projecting portions arranged on left and right sides of the seat surface portion, the projecting portions projecting toward an occupant side to support the sides of an occupant, and the first region may consist of the seat surface portion and the second region may consist of the projecting portions.

According to this configuration, the seat surface portion and the projecting portions can be efficiently heated.

The vehicle seat may be configured to further comprise a temperature sensor which detects a temperature of the seat surface portion, wherein the controller is configured to: execute a seat surface portion heating process in which current is provided only to the first heater upon receiving a command to heat the vehicle seat; execute, after the seat surface portion heating process, a projecting portion heating process in which a first current-application timeframe and a second current-application timeframe are set such that a sum of time periods of the first current-application timeframe and the second current-application timeframe is equal to the unit time period; and execute, after the projecting portion heating process, a feedback process in which the first current-application timeframe and the second current-application timeframe are set based on a detected temperature acquired from the temperature sensor, and wherein, in the projecting portion heating process, one of the first current-application timeframe and the second current-application timeframe is set to have a duration longer than a duration of the other of the first current-application timeframe and the second current-application timeframe.

According to this configuration, since, in the projecting portion heating process, the sum of the time periods of the first current-application timeframe and the second current-application timeframe are set such that the sum of the time periods of the first current-application timeframe and the second current-application timeframe are equal to the unit time period, the unit time period can be used for heating without wasting time.

In the projecting portion heating process, the controller may set the second current-application timeframe to have a duration longer than a duration of the first current-application timeframe.

According to this configuration, in the projecting portion heating process executed after heating the seat surface portion with a higher priority in the seat surface portion heating process, the projecting portions can be heated with a higher priority.

In the projecting portion heating process, the controller may set the first current-application timeframe to have a duration longer than a duration of the second current-application timeframe.

According to this configuration, in the projecting portion heating process executed after heating the seat surface portion with a higher priority in the seat surface portion heating process, the seat surface portion can be heated with a higher priority again, for example, if the temperature of the seat surface portion is lower than a predetermined temperature.

In the seat surface portion heating process, the controller may be configured to measure time after receiving the command until the detected temperature reaches a predetermined temperature, and set an execution time of the projecting portion heating process based on the measured time.

According to this configuration, the execution time of the projecting portion heating process can be set to an appropriate duration.

To solve the aforementioned third problem, a vehicle seat includes a pad, a covering which covers the pad, a resistance heating element, and a support sheet which supports the resistance heating element, and comprises a planar heating element provided between the pad and the covering. The pad includes a seat surface portion arranged in a laterally central position, projecting portions arranged on left and right sides of the seat surface portion, the projecting portions projecting toward an occupant side to support sides of an occupant, and a tuck-in groove into which the covering is tucked in, the tuck-in groove including parting portions arranged between the seat surface portion and the projecting portions and extending orthogonal to a lateral direction; the planar heating element includes a first heater arranged in the seat surface portion, second heaters arranged in the projecting portions, and a connecting portion connecting the first heater and the second heaters, the connecting portion being arranged around the parting portions and connecting the first heater and the second heaters.

According to this configuration, since the connecting portion connecting the first heater and the second heaters is arranged around the tuck-in grooves, it is possible to provide a vehicle seat with a planar heating element which is less susceptible to damage with a simple configuration.

The vehicle seat described above may be configured such that the pad is a seat cushion pad and the parting portions are configured to extend in the front-rear direction. In this case, the connecting portion may be arranged along the rear side of the parting portions to connect the first heater and the second heater.

According to this configuration, it is possible to connect the first heater and the second heater along the rear side of the parting portions which is less likely to be subjected to a load.

The vehicle seat described above may be configured such that the pad is a cushion pad, the parting portions are configured to extend in the front-rear direction, and the connecting portion is arranged along a front side surface of the pad at a front side of the parting portions to connect the first heater and the second heater.

According to this configuration, even when the connecting portion is arranged along the front side of the parting portions, it is less likely to be subjected to a large load by being arranged along a front side surface of the pad. Further, when the connecting portion is comprised of a heater, it can heat the calves of the occupant and can increase comfort.

The vehicle seat described above may be configured such that the pad is a seat back pad, the parting portions extend in the up-down direction, and the connecting portion is arranged along the upper side or lower side of the parting portions to connect the first heater and the second heater.

According to this configuration, in a seat back, since the connecting portion is arranged along the upper side or lower side of the parting portions to connect the first heater and the second heater, it is possible to connect the first heater and the second heater along a portion which is less likely to be subjected to a load.

BRIEF DESCRIPTION OF DRAWINGS

FIG. 2 (a) is a side view of the car seat from a lateral direction, and (b) is a plan view showing the configuration of a planar heating element.

FIG. 3 (a) is diagram showing the relation between a thermostat and a contacting portion, and (b) is a diagram showing a modified example of the relation between a thermostat and the contacting portion.

FIG. 4 is a circuit diagram showing the relation of the configuration of a planar heating element and a controller and the like.

FIG. 5 (a) to (c) are time charts showing the states of electric power in each process of the controller.

DESCRIPTION OF EMBODIMENTS

Figure 1:
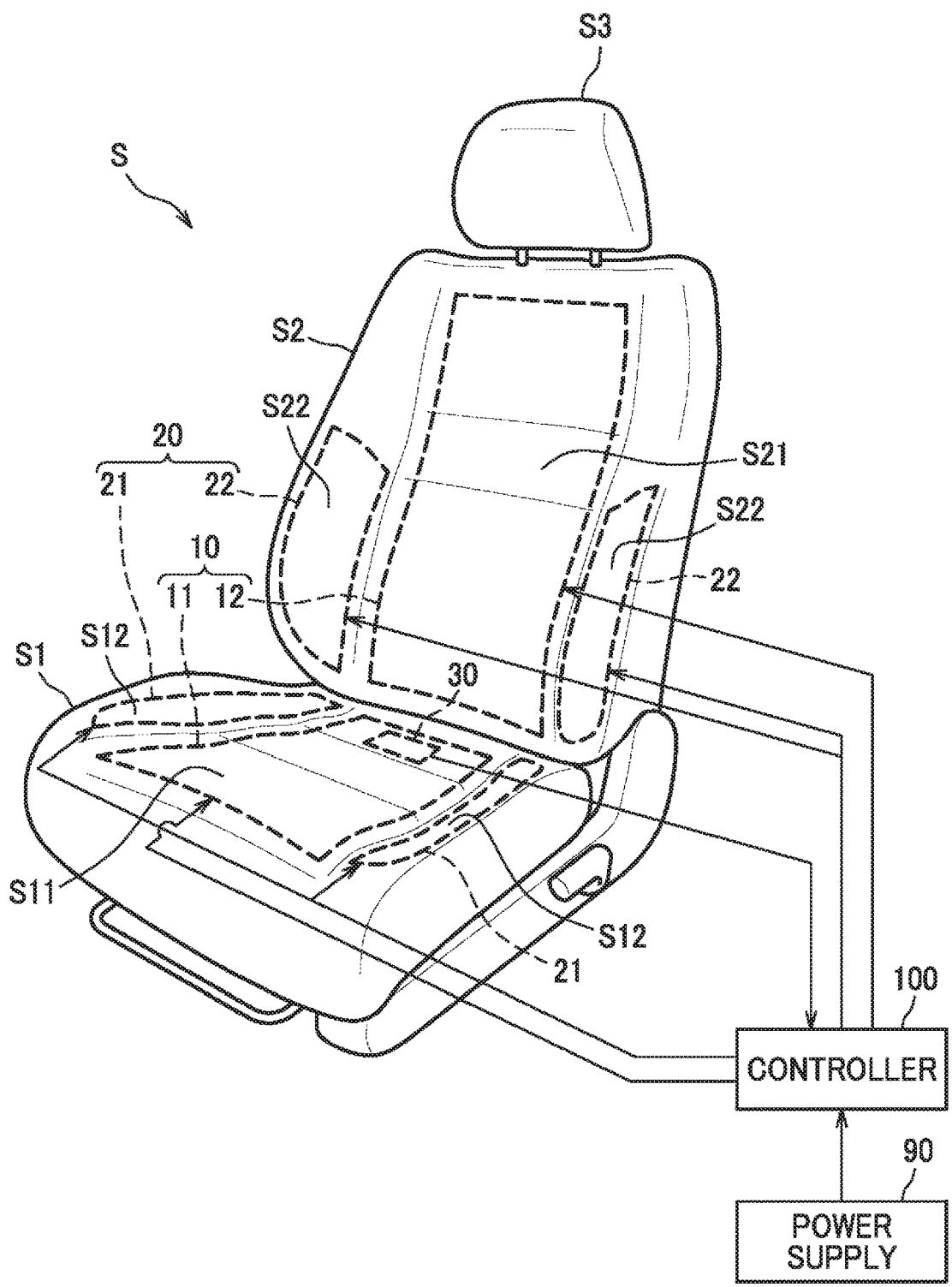
FIG. 1 is a perspective view of a car seat according to an embodiment of a vehicle seat.

Hereinafter, a description of an embodiment of a vehicle seat will be given with reference to the accompanying drawings. The vehicle seat, for example, as shown in FIG. 1, is configured as a car seat S installed in an automobile. The car seat S includes a seat cushion S1, a seat back S2 and a headrest S3 which are each comprised of a pad material made of urethane foam or other cushion material covered with covering material made of synthetic leather, fabrics or the like.

The seat cushion S1 includes a seat surface portion S11 arranged in a laterally central position and configured to contact and support from below the buttocks and thighs of an occupant, and projecting portions S12 arranged on laterally outer sides of the seat surface portion S11 and projecting toward an occupant side so as to support the sides of the buttocks and thighs of the occupant.

The seat back S2 similarly includes a seat surface portion S21 arranged in a laterally central position and configured to contact and support from behind the back of the occupant, and projecting portions S22 arranged on laterally outer sides of the seat surface portion S21 and configured to project toward an occupant side so as to support the sides of an upper body of the occupant.

In the seat surface portion S11 of the seat cushion S1 and the seat surface portion S21 of the seat back S2, central heaters 11, 12, as a first heater 10, are respectively arranged inside the covering. In the projecting portions S12 of the seat cushion S1 and the projecting portions S22 of the seat back S2, side heaters 21, 22, as a second heater 20, are respectively arranged inside the covering. That is, the parts heated by the first heater 10 are the seat surface portions S11, S21, and the parts heated by the second heater 20 are the projecting portions S12, S22. In other words, the seat surface portions S11, S21 correspond to a first region, and the projecting portions S12, S22 correspond to a second region different from the first region.

The seat surface portion S11 of the seat cushion S1 includes, inside the covering and in a section corresponding to the first heater 10, a temperature sensor 30 for detecting a temperature of the seat surface portion S11. The temperature sensor 30 is arranged in a position which is not affected by the body heat of the occupant. For example, the temperature sensor 30 may be arranged under the seat back S2 or at the rear portion of the seat cushion S1. The temperature detected by the temperature sensor 30 and the temperature of the section of the seat surface portion S11 which the occupant contacts has an almost constant correlation. A controller 100 may use the temperature detected by the temperature sensor 30 as the detected temperature for control or may estimate the temperature of the section which the occupant contacts based on the correlation described above and use the estimated temperature as the detected temperature T for control.

The controller 100 is arranged in an appropriate position in the car seat S. The aforementioned temperature sensor 30 is connected to the controller 100 so as to output a detected temperature T signal to the controller 100. The first heater 10 and the second heater 20 are connected to the controller 100. Electric power is provided to the controller 100 from a battery-driven power supply 90 mounted on the car, and the controller 100 is configured to control electric power based on the detected temperature T acquired from the temperature sensor 30 to regulate the output of the first heater 10 and the second heater 20. The power supply 90 is configured to provide electric power to the first heater 10 and the second heater 20 of the car seat S within predetermined upper output limits; in this embodiment, the electric power upper limit PW1 for the first heater 10 is set to be larger than the electric power upper limit PW2 for the second heater 20. For example, the upper limit PW1 may be 80 W and the upper limit PW2 may be 60 W.

The electric power upper limits for the heaters 10, 20 may be set as desired in terms of relative magnitudes, specific numerical values, etc. For example, the electric power upper limits for the respective heaters 10, 20 may be set to have the same value, or an electric power upper limit for the heater 10 may be set to be lower than an electric power upper limit for the heater 20.

As shown in FIG. 2(b), a planar heating element 50 including a central heater 11 and side heaters 21 is positioned between the covering and the pad of the seat cushion S1. Such planar heating element is also provided in the seat back S2; however, explanation regarding the planar heating element in the seat back S2 will be omitted since it has almost the same structure as that of the planar heating element 50 provided in the seat cushion S1.

The planar heating element 50 comprises a heater circuit 40 including the heaters 11, 21 and two support sheets 51 sandwiching the heater circuit 40. The support sheets 51 are made of insulation material such as nonwoven fabric and sandwiches all components and wiring forming the heater circuit 40. In this way, the connecting portion CP connecting each of the heaters 11, 21 and a thermostat 45 described below is sandwiched between the support sheets 51.

The heater circuit 40 includes, in addition to the heaters 11, 21, a connecting terminal 41, a thermistor 43 and the thermostat 45.

The connecting terminal 41 is a terminal to which electric power is supplied from the controller 100 and is connected to the controller 100 via a cable C1. The cable C1 is detachably connected to the connecting terminal 41.

The connecting terminal 41 is arranged in a laterally central position at a rear edge of the planar heating element 50.

The thermistor 43 is connected to the controller 100 and is arranged near the central heater 11 to be able to detect the temperature thereof. It is more preferable if the thermistor 43 is arranged so that it can detect the temperature of a sub-heater 13 (see FIG. 4) connected to the central heater 11.

The thermostat 45 has a function of cutting off application of current to the heaters 10, 20 on its own by making use of a physical phenomenon, without being controlled by the controller 100. The structure of the thermostat 45 is described afterwards.

The thermistor 43 and the thermostat 45 are respectively arranged in the same position in the front-rear direction at the rear end portion of the seat cushion S1. In more detail, as shown in FIG. 2(a), the thermistor 43 and the thermostat 45 are arranged between contacting portions TP of the seat cushion S1 and the seat back S2. Here, the contacting portions TP form a section where the seat cushion S1 and the seat back S2 contact each other. The seat cushion S1 and the seat back S2 each have a contacting portion TP.

The relative positions of the thermostat 45 and the contacting portions TP in the front-rear direction will be explained hereinafter. Explanation regarding the relative positions of the thermistor 43, which is in the same position as the thermostat 45 in the front-rear direction, and the contacting portions TP will be omitted.

As shown in FIG. 3(a), the thermostat 45 is arranged to overlap the central position L1 of the contacting portions TP in the front-rear direction. The location of the thermostat 45 is not limited to this position and the thermostat 45 may be arranged, for example, such that the central position L2 thereof overlaps the contacting portions TP, as shown in FIG. 3(b).

Returning to FIG. 2(b), the thermistor 43 is positioned on the right side of the connecting terminal 41, and the thermostat 45 is positioned on the left side of the connecting terminal 41. In this way, a space for installing the wiring of the heater circuit 40 is provided between the thermistor 43 and the thermostat 45. FIG. 2(b) is a circuit diagram schematically showing the wiring of the heater circuit 40; actual wiring is arranged along a complicated route such that the space described above is effectively used.

Next, the configuration of the heater circuit 40 will be explained in detail using the circuit diagram of FIG. 4 which simplifies the circuit diagram of FIG. 2(b). Since the central heater 11 and the side heaters 21 are each connected to the controller 100 by a separate wiring, the central heater 11 and the side heaters 21 are each configured to be independently controllable by the controller 100. The thermostat 45 is connected to the ground side with respect to the central heater 11 and the side heaters 21.

The thermostat 45 comprises a current-application interrupting portion 45A which functions as a switch for switching a current-application state, and a heating resistor 45B for heating the current-application interrupting portion 45A. The current-application interrupting portion 45A is made of a bimetal which deforms in response to temperature change; it is configured to connect each heater 11, 21 to the ground under normal conditions, and to disconnect each heater 11, 21 from the ground when the temperature reaches or exceeds a predetermined temperature. Current through the central heater 11 and current through the side heaters 21 do not flow to the thermostat 45 at the same time but are applied to the thermostat 45 alternately. When such current is input to the thermostat 45, the heating resistor 45B produces an amount of heat which corresponds to the magnitude of current. When this heat causes the temperature of the current-application interrupting portion 45A to reach or exceed a predetermined temperature, the current-application interrupting portion 45A is switched off and application of current to each of the heaters 11, 21 is interrupted.

One end of the central heater 11 is connected to the controller 100 and the other end of the central heater 11 is connected to the sub-heater 13. In the vicinity of the sub-heater 13, there is positioned the thermistor 43. The thermistor 43 is connected to the controller 100.

The other end of the sub-heater 13 is connected to the thermostat 45. One end of the side heaters 21 is connected to the controller 100 and the other end of the side heaters 21 is connected to the thermostat 45.

The controller 100 has a function off separately cutting off application of current to the central heater 11 and the side heaters 21 based on a signal detected at the thermistor 43, to be more specific, based on current which fluctuates in response to temperature changes in the sub-heater 13.

Specifically, the controller 100 cuts off application of current to the central heater 11 when the temperature detected at the thermistor 43 is at or over a predetermined value, in other words, when current output from the thermistor 43 is at or over a predetermined threshold. Further, the controller 100 is configured to cut off application of current based on current output from the thermistor 43 before the thermostat 45 is switched off, when an excessive current is likely to flow through the central heater 11. When an abnormal condition of the thermistor 43 or controller 100 occurs and an excessive current is likely to flow through the central heater 11, current application can be shut down by the thermostat 45 switching off independently of the control of the controller 100. Since the control of the side heaters 21 using the thermistor 43 is the same as the control of the central heater 11, explanation will be omitted.

The controller 100 is connected to an operation switch for the heater mounted on a car, receives a command to heat the car seat S from the operation switch, and regulates application of current to the first heater 10 and the second heater 20. As shown in FIG. 5(a) to (c), the controller 100 is configured to execute, for a heating period initiated upon receipt of a command from the operation switch to raise the detected temperature T to a target temperature T2, the following processes: a seat surface portion heating process in which the first heater 10 is intensively caused to heat up to quickly raise the temperature of the seat surface portions S11, S21 with which an occupant is in contact; a projecting portion heating process in which the second heater 20 is caused to start heating up to raise the temperature of the projecting portions S12, S22 toward the temperature of the seat surface portions S11, S21; and a feedback process in which after the temperature of the projecting portions S12, S22 are raised to a certain degree, the detected temperature T is adjusted to the target temperature T2.

As is the case in warm seasons and/or when the heater was used before operating the operation switch, the detected temperature T obtained when a heating command is received via the operation switch may be higher than the target temperature T2. In this case, the controller 100 does not execute the control processes for the heating period described above and starts the control from the feedback process.

The controller 100 is capable of executing PWM control under which current applied to the first heater 10 and the second heater 20 are regulated by setting current-application timeframes within a unit time period Tu, in the seat surface portion heating process, the projecting portion heating process and the feedback process. The controller 100 is configured such that in the projecting portion heating process and the feedback process, a first current-application timeframe Ts1 that is a period within the unit time period Tu in which current is applied to the first heater 10 and a second current-application timeframe Ts2 that is a period within the unit time period Tu in which current is applied to the second heater 20, as set under the PWM control, are shifted relative to each other when current is applied to the first heater 10 and the second heater 20.

In other words, the unit time period within which current is applied to the first heater 10 under the PWM control and the unit time period within which current is applied to the second heater 20 under the PWM control is the same unit time period Tu. Further, the start time and end time of the first current-application timeframe Ts1 and the start time and end time of the second current-application timeframe Ts2 are each set such that the first current-application timeframe Ts1 and the second current-application timeframe Ts2 do not overlap within the unit time period Tu.

The controller 100 executes the seat surface portion heating process shown in FIG. 5(a) upon receiving a command to heat the car seat S. In the seat surface portion heating process, the first current-application time frame Ts1 is set to have a duration equal to that of the unit time period Tu, and the second current-application time frame Ts2 is set to be zero. That is, in the seat surface portion heating process, the duty cycle of current applied to the first heater 10 (hereinafter also referred to as "first duty cycle") is set at 100% and the duty cycle of current applied to the second heater (hereinafter also referred to as "second duty cycle") is set at 0%. As a result, in the seat surface portion heating process, the controller 100 only applies current to the first heater 10. If the upper limit PW1 of electric power to the first heater 10 is set at 80 W, an electric power of 80 W is applied to the first heater 10.

In the seat surface portion heating process, the controller 100 measures the time elapsed after receiving the command until the detected temperature T reaches a predetermined temperature T1 lower than a target temperature T2, and sets an execution time of the projecting portion heating process based on the measured time. Specifically, the longer the measured time, the longer the execution time of the projecting portion heating process set by the controller 100. Since it takes a long time to heat the seat surface portions S11, S21 and the projecting portions S12, S22 when the temperature of the car seat S is low at the start of heating the car seat S, it is possible to favorably heat the seat surface portions S11, S22 and the projecting portions S12, S22 by extending the execution time of the projecting portion heating process in accordance with the longer measured time it has taken for the detected temperature T to reach the predetermined temperature T1.

After the seat surface portion heating process, the controller 100 executes the projecting portion heating process shown in FIG. 5(b). In the projecting portion heating process, the first current-application timeframe Ts1 and the second current-application timeframe Ts2 are each set to a have a time period longer than 0 such that the sum of the time periods of the first current-application timeframe Ts1 and the second current-application timeframe Ts2 is equal to the unit time period Tu. Further, in this embodiment, the second current-application timeframe Ts2 is set to have a longer duration than that of the first current-application timeframe Ts1. In this way, in the projecting portion heating process, the second duty cycle will become larger than the first duty cycle and it will be possible to heat the projecting portions S12 with a higher priority.

In the projecting portion heating process, as one example, the first duty cycle may be set at 40% and the second duty cycle may be set at 60%. In this case, when the upper limit PW1 of electric power to the first heater 10 is 80 W and the upper limit PW2 of electric power to the second heater 20 is 60 W, an electric power of 32 W is applied to the first heater 10 and an electric power of 36 W is applied to the second heater 20.

After the projecting portion heating process, the controller 100 executes the feedback process shown in FIG. 5(c). In the feedback process, the controller 100 sets the first current-application time frame Ts1 and the second current-application time frame Ts2 based on a detected temperature acquired from the temperature sensor 30. More specifically, in the feedback process, the controller 100 sets the first current-application timeframe Ts1 and the second current-application timeframe so that the detected temperature T reaches a target temperature T2. For example, in the feedback process, the controller 100 executes PI control.

The controller 100 calculates the required control variable my based on the detected temperature T and the target temperature T2. The required control variable my, for example, can be calculated as a so-called required control variable in PI control, as follows.

$$mv = Kp \times e + ie/Ki$$

Here, e is the difference between the target temperature T2 and the detected temperature T, Kp is the proportional control constant, ie is an integral (summation) of e in a predetermined past time period, and Ki is an integral control constant. Each constant Kp, Ki is set such that the required control variable my can be used as an output indication value (a value indicating the first current-application time frame Ts1 and the second current-application time frame Ts2) in the feedback process executed after the detected temperature T has approached the target temperature T2. The detected temperature T and the target temperature T2 do not have to be in a unit such as "° C." in this calculation, but may be a digitized voltage output from the temperature sensor 30. Each constant Kp, Ki is preferably adjusted as appropriate also depending on the scale of the temperature value.

The process of the controller 100 in the car seat S as described above will be explained with reference to FIG. 6.

Figure 6:
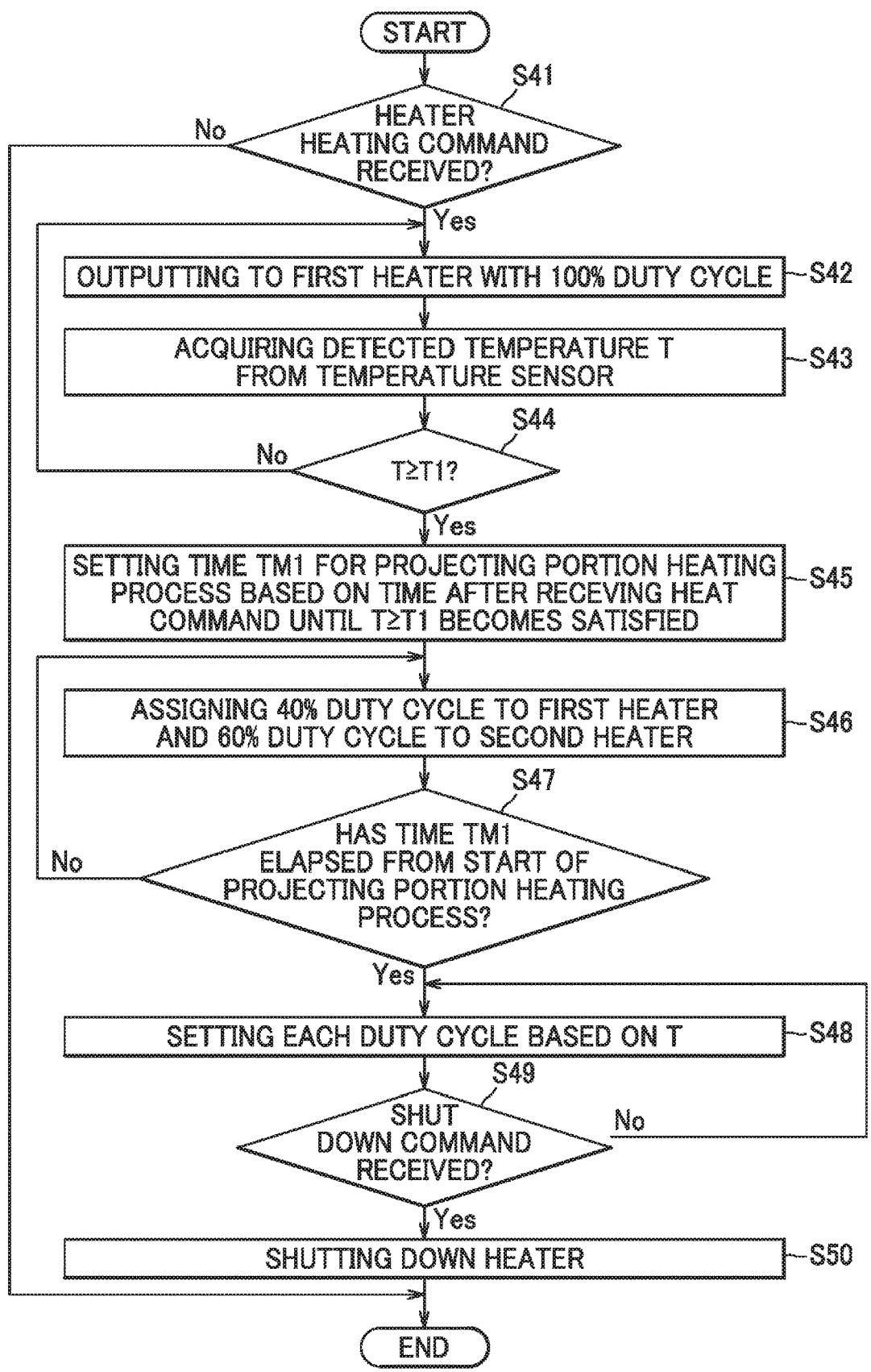
FIG. 6 is a flowchart showing a process of the controller.

Controller 100 repeats the process shown in FIG. 6 from start to end in each control cycle. First, the controller 100 determines whether or not a heater heating command has been received; if no command has been received (S41, No), it ends the process, if a command has been received (S41, Yes), it proceeds to step S42 and executes the seat surface portion heating process (S42 to S45).

In step S42, the controller 100 sets the duty cycle of current applied to the first heater 10 at 100% by setting the time period of a first current-application timeframe Ts1 equal to the unit time period Tu and provides 100% output to the first heater 10. After step S42, the controller 100 acquires a detected temperature T from the temperature sensor 30 (S43), and determines whether or not the detected temperature T has reached or exceeded the predetermined temperature T1 (S44).

If it is determined that T≥T1 is not satisfied (No) in step S44, the controller 100 returns to the process of step S42. If it is determined that T≥T1 is satisfied (Yes) in step S44, the controller 100 sets the execution time TM1 of the projecting portion heating process based on the time elapsed after receiving a heating command until T≥T1 becomes satisfied (S45).

After step 45, the controller 100 starts the projecting portion heating process by setting the first current-application time frame Ts1 and the second current-application time frame Ts2 such that the sum of the time periods of the first current-application time frame Ts1 and the second current-application time frame Ts2 is equal to the unit time period Tu (S46). Specifically, in step S46, for example, the controller 100 applies current to the heaters 10, 20 with a first duty cycle of 40% and a second duty cycle of 60%, by assigning the former 40% of the unit time period Tu to the first current-application time frame Ts1, and the latter 60% to the second current-application time frame Ts2.

After step S46, the controller 100 determines if an execution time TM1 has lapsed since the start of the projecting portion heating process (S47). In step S47, if it is determined that execution time TM1 has not lapsed (No), the controller 100 returns to the process of step S46. In step S47, if it is determined that execution time TM1 has lapsed (Yes), the controller 100 executes the feedback process in which the first current-application timeframe Ts1 and the second current-application timeframe Ts2, i.e., respective duty cycles are set based on the detected temperature T so that the detected temperature T reaches the target temperature T2 (S48).

After step S48, the controller 100 determines whether or not a heater shutdown command has been received (S49). In step S49, if the controller 100 has not received a shutdown command (No), it returns to the process of step S48; while if the controller 100 has received a shutdown command (Yes), it cuts off application of current to the heaters 10, 20 (S50) and ends the process.

Figure 7:
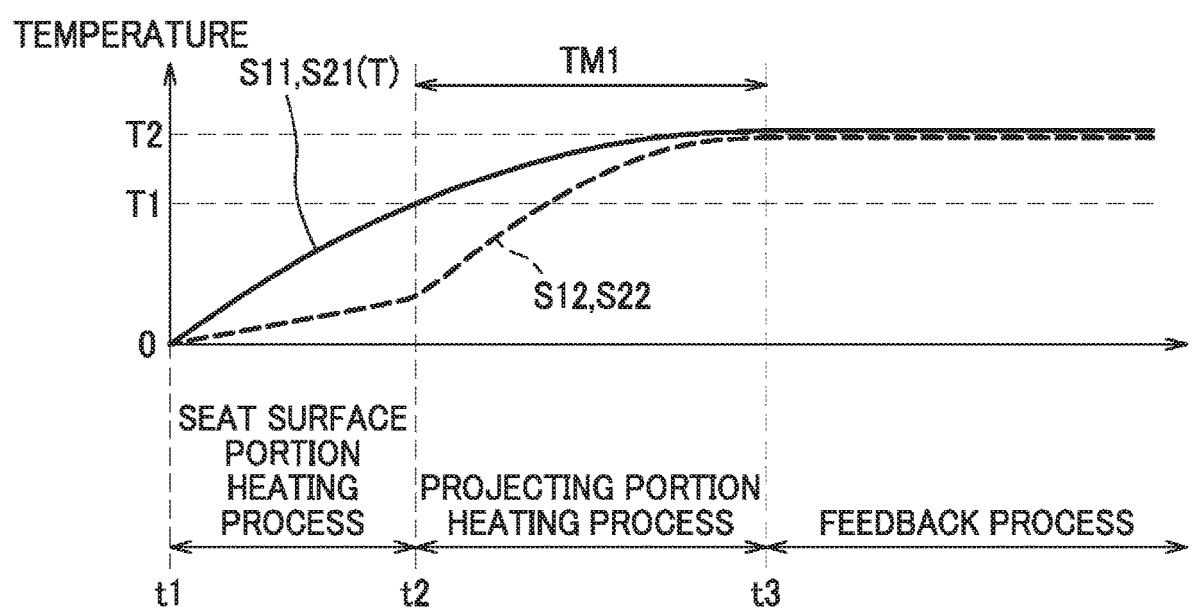
FIG. 7 is a time chart showing an example of temperature changes in a seat surface portion and projecting portions in a heating process of the controller.

Next, an example operation of the controller 100 will be explained with reference to FIG. 7. In FIG. 7, the solid line shows the temperature of the seat surface portions S11, S21 and the broken line shows the temperature of the projecting portions S12, S22.

As shown in FIG. 7, the controller 100 executes the seat surface portion heating process upon receiving a heating command (time t1). As a result, electric power is only provided to the first heater 10 and the temperature of the seat surface portions S11, S21 eventually rise. It is understood that in the projecting portions S12, S22, the temperature rises with a gradient smaller than the temperature gradient of the seat surface portions S11, S21 due to the body heat of the occupant seated on the car seat S.

When the detected temperature T reaches a predetermined temperature (time t2), the controller 100 ends the seat surface portion heating process and starts the projecting portion heating process. In the projecting portion heating process, since the second current-application timeframe Ts2 is set to have a longer duration than that of the first current-application timeframe Ts1, the projecting portions S12, S22 are heated with a higher priority than the seat surface portions S11, S21. Thus, the temperature gradient of the projecting portions S12, S22 become larger than the temperature gradient of the seat surface portions S11, S21, and the temperature of the projecting portions S12, S22 gradually approach the temperatures of the seat surface portions S11, S21.

When the execution time TM1 elapses from the start of the projecting portion heating process (time t3), the controller 100 ends the projecting portion heating process and executes the feedback process. Here, since the execution time TM1 is determined based on the time elapsed after receiving a heating command until the detected temperature T reaches a predetermined temperature, i.e., the execution time TM1 is determined based on the execution time of the seat surface portion heating process, the temperatures of the projecting portions S12, S22 and the temperatures of the seat surface portions S11, S21 will reach a value close to the target temperature T2 at the time the projecting portion heating process ends. Therefore, by starting the feedback process in this condition, the temperatures of the projecting portions S12, S22 and the temperatures of the seat surface portions S11, S21 can be favorably maintained at the target temperature T2.

Next, the operation of the controller 100 or the thermostat 45 when excess current is likely to flow to the first heater 10 or the second heater 20 will be explained with reference to FIG. 4.

Figure 4:
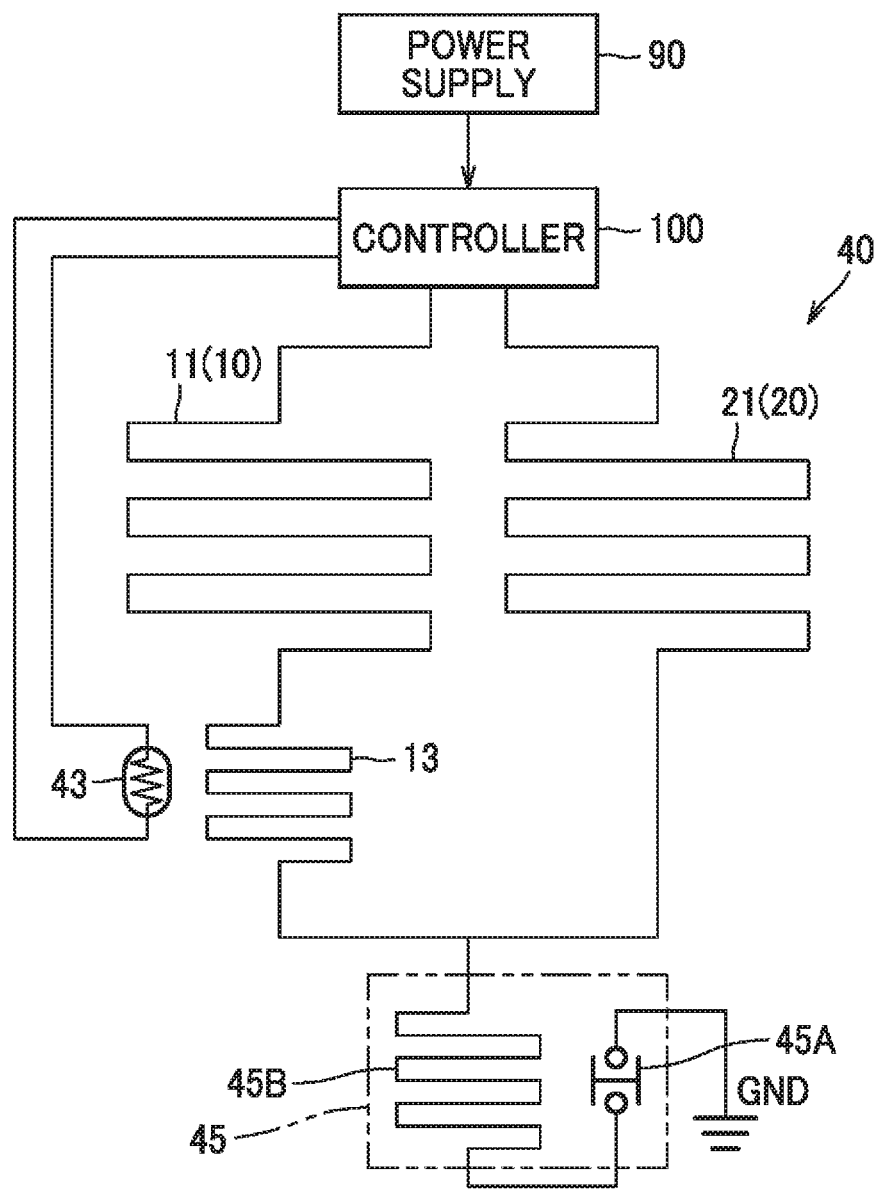

As shown in FIG. 4, when current output from the thermistor 43 reaches or exceeds a predetermined threshold during application of current to the first heater 10 or the second heater 20, the controller 100 cuts off application of current before the thermostat 45 switches off. Further, upon application of current, when excess current is likely to flow to the first heater 10 or the second heater 20 due to an abnormal condition of the controller 100, for example, the thermostat 45 switches off to cut off application of current.

According to the present embodiment, the following advantageous effects can be obtained.

Since only one thermostat 45 needs to be provided for a plurality of heaters 10, 20, the cost can be cut down.

Since the connecting portion between each heater 10, 20 and the thermostat 45 is sandwiched between support sheets 51, the connecting portion between each heater 10, 20 and the thermostat 45 can be restrained from being short-circuited to the ground.

Since a thermistor 43 is provided to cut off application of current, in addition to a thermistor 45, in the case excess current is likely to flow to each heater 10, 20, application of current can be cut off by the controller 100 based on a signal detected at the thermistor 43 without activating the thermostat 45.

Since the thermostat 45 is positioned to overlap the central position of the contacting portions TP in the front-rear direction, the thermostat 45 positioned on the ground side may be sandwiched and protected between the seat cushion S1 and the seat back S2.

Since the first current-application timeframe Ts1 that is a period in which current is applied to the first heater 10 and the second current-application timeframe Ts2 that is a period in which current is applied to the second heater 20 are shifted relative to each other, a peak power may be reduced. By reducing the peak power in such a manner, it is possible to suppress a peak value of current in the thermostat 45 to which current through each heater 10, 20 is applied; thus, even though there is one thermostat 45, it can function sufficiently. Further, since the first current-application timeframe Ts1 and the second current-application timeframe Ts2 are shifted relative to each other within the unit time period Tu of the PWM control, a fine adjustment in control can be made so that the seat surface portions S11, S21 and the projecting portions S12, S22 can be efficiently heated.

Since, in the projecting portion heating process, the first current-application timeframe Ts1 and the second current-application timeframe Ts2 are set such that the sum of the time periods of the first current-application timeframe Ts1 and the second current-application timeframe Ts2 is equal to the unit time period Tu, the unit time period Tu can be used for heating without wasting time.

Since, in the projecting portion heating process, the second current-application timeframe Ts2 is set to have a duration longer than the first current-application timeframe Ts1, the projecting portions S12, S22 may be heated with a higher priority in the projecting portion heating process executed after heating the seat surface portions S11, S21 with a higher priority in the seat surface portion heating process.

Since, in the seat surface portion heating process, the execution time TM1 of the projecting portion heating process is set based on the time after receiving a heating command until the detected temperature T reaches a predetermined temperature T1, an appropriate time period can be set as the execution time of the projecting portion heating process.

One embodiment has been explained, but the vehicle seat of the present disclosure may be appropriately modified and implemented as shown in the other embodiments described below.

In the abovementioned embodiment, the first region consists of the seat surface portions S11, S21 and the second region consists of the projecting portions S12, S22; however, the present disclosure is not limit to this configuration. The first region may be defined as any portion of the seat cushion or the seat back, and the second region may be defined as any portion of the seat cushion or the seat back as long as it is a region different from the first region. For example, a portion of the seat cushion may be defined as the first region and a portion of the seat back may be defined as the second region.

In the aforementioned embodiment, in the projecting portion heating process, the second current-application timeframe Ts2 is set to have a duration longer than that of the first current-application timeframe Ts1; however the present disclosure is not limited to this configuration and the first current-application timeframe Ts1 may be set to have a longer duration than that of the second current-application timeframe Ts2 in the projecting portion heating process.

Here, if the condition for ending the seat surface portion heating process is the elapse of a predetermined time period after receiving a heating command, the seat surface portion may still not be warm enough at the end of the seat surface portion heating process. In this case it will become necessary to heat the seat surface portion with a higher priority than the projecting portions in the projecting portion heating process. In such case, in the projecting portion heating process, by setting the first current-application timeframe to have a duration longer than the second current-application timeframe, the seat surface portion can be heated with a higher priority again.

In the projecting portion heating process, the first current-application timeframe and the second current-application timeframe may be set to have the same duration.

In the embodiment described above, in the projecting portion heating process, each current-application timeframe Ts1, Ts2 is set as a fixed value; however, the present disclosure is not limited to this and each current-application timeframe Ts1, Ts2 may be varied such that the percentage of the second current-application timeframe increases as the execution time of the seat surface portion heating process becomes longer, for example.

The locations of the thermistor 43 and the thermostat 45 are not limited to those described in the aforementioned embodiment, but may be disposed in any location. Further, in the aforementioned embodiment, there is only one thermistor 43; however, a plurality of thermistors may be provided, one for each heater.

In the aforementioned embodiment, a car seat S used in an automobile is given as an example of a vehicle seat: However, the present disclosure is not limited to this and it may be applied to other car seat S such as seats used in ships or aircrafts. Further, in the aforementioned embodiment, an independent type seat adopted as a driver's seat of an automobile is exemplified; however, the present disclosure may be applied to a bench type seat which is often adopted as a rear seat of an automobile.

In the aforementioned embodiment, the temperature sensor 30 is provided in the seat surface portion S11 of the seat cushion S1; however, the present disclosure is not limited to this and the temperature sensor may be provided in the seat surface portion of the seat back or the temperature sensor may be provided in each of the seat surface portions of the seat cushion and the seat back, for example.

Further, any elements which have been explained in the aforementioned embodiment and modifications thereof may be implemented in combination.

Next, another vehicle seat will be explained.

First Embodiment

Figure 8:
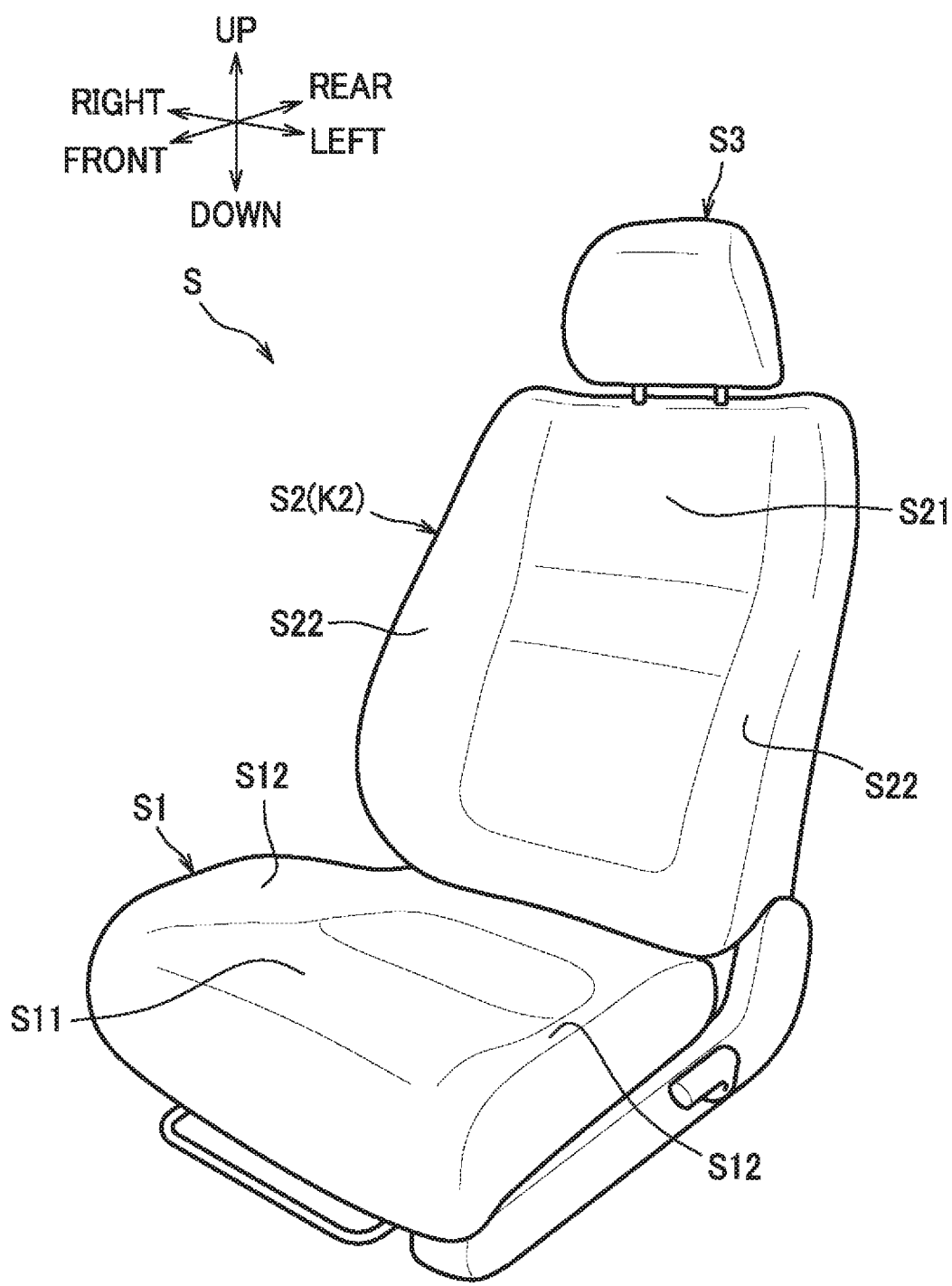
FIG. 8 is a perspective view of a car seat according to a first embodiment of another vehicle seat.

A vehicle seat of a first embodiment, for example, as shown in FIG. 8, is configured as a car seat S installed in an automobile. The car seat S includes a seat cushion S1, a seat back S2 and a headrest S3.

The seat cushion S1 includes a seat surface portion S11 arranged in a laterally central position and configured to contact and support from below the buttocks and thighs of an occupant, and projecting portions S12 arranged on laterally outer sides of the seat surface portion S11 and configured to project toward an occupant side so as to support the sides of the buttocks and thighs of the occupant.

The seat back S2 similarly includes a seat surface portion S21 arranged in a laterally central position and configured to contact and support from behind the back of the occupant, and projecting portions S22 arranged on laterally outer sides of the seat surface portion S21 and configured to project toward an occupant side so as to support the sides of an upper body of the occupant.

Figure 9:
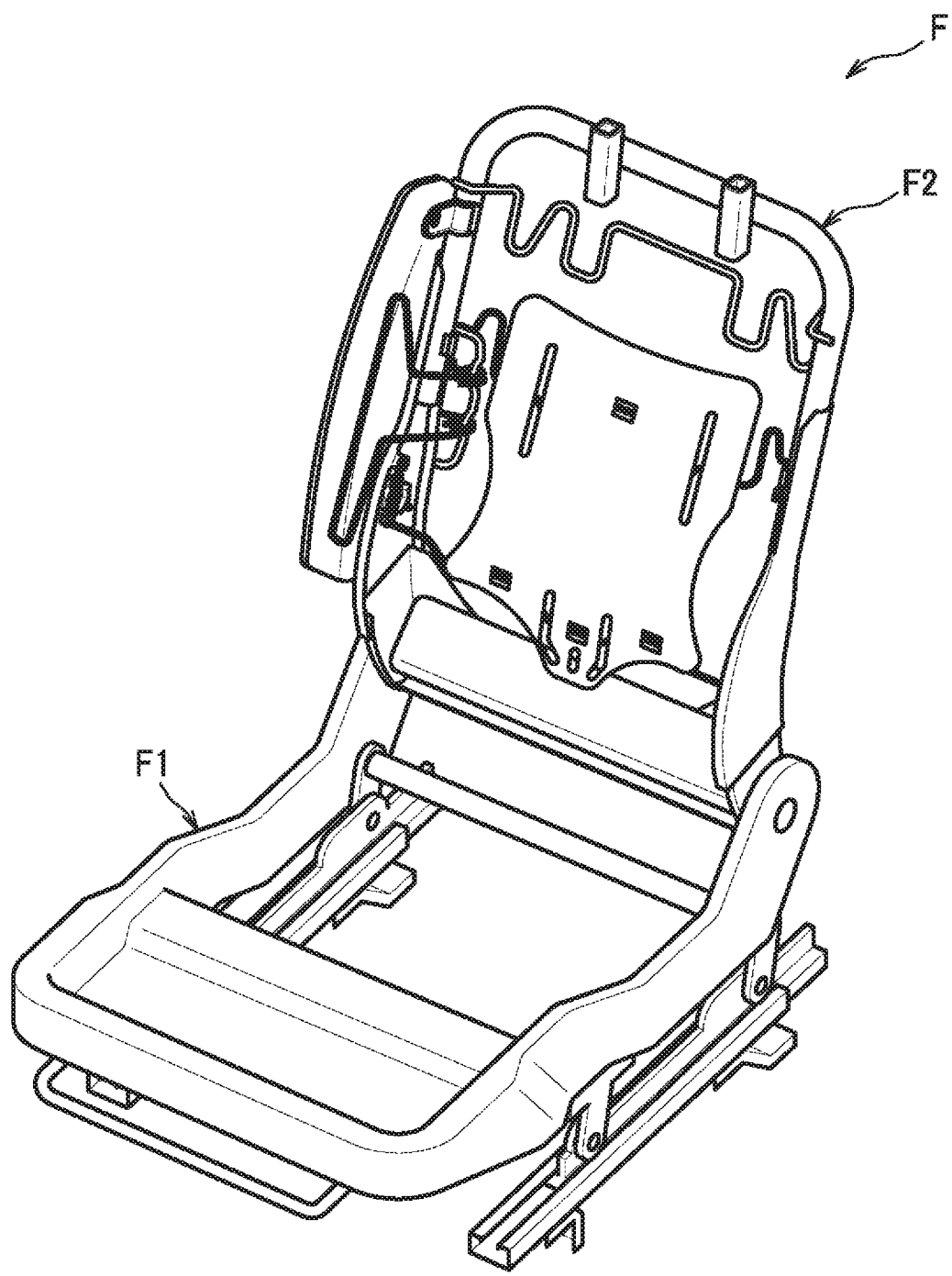
FIG. 9 is a perspective view of a seat frame.

As shown in FIG. 9, a seat frame F comprises a seat cushion frame F1 and a seat back frame F2 supported by the seat cushion frame F1.

Figure 10:
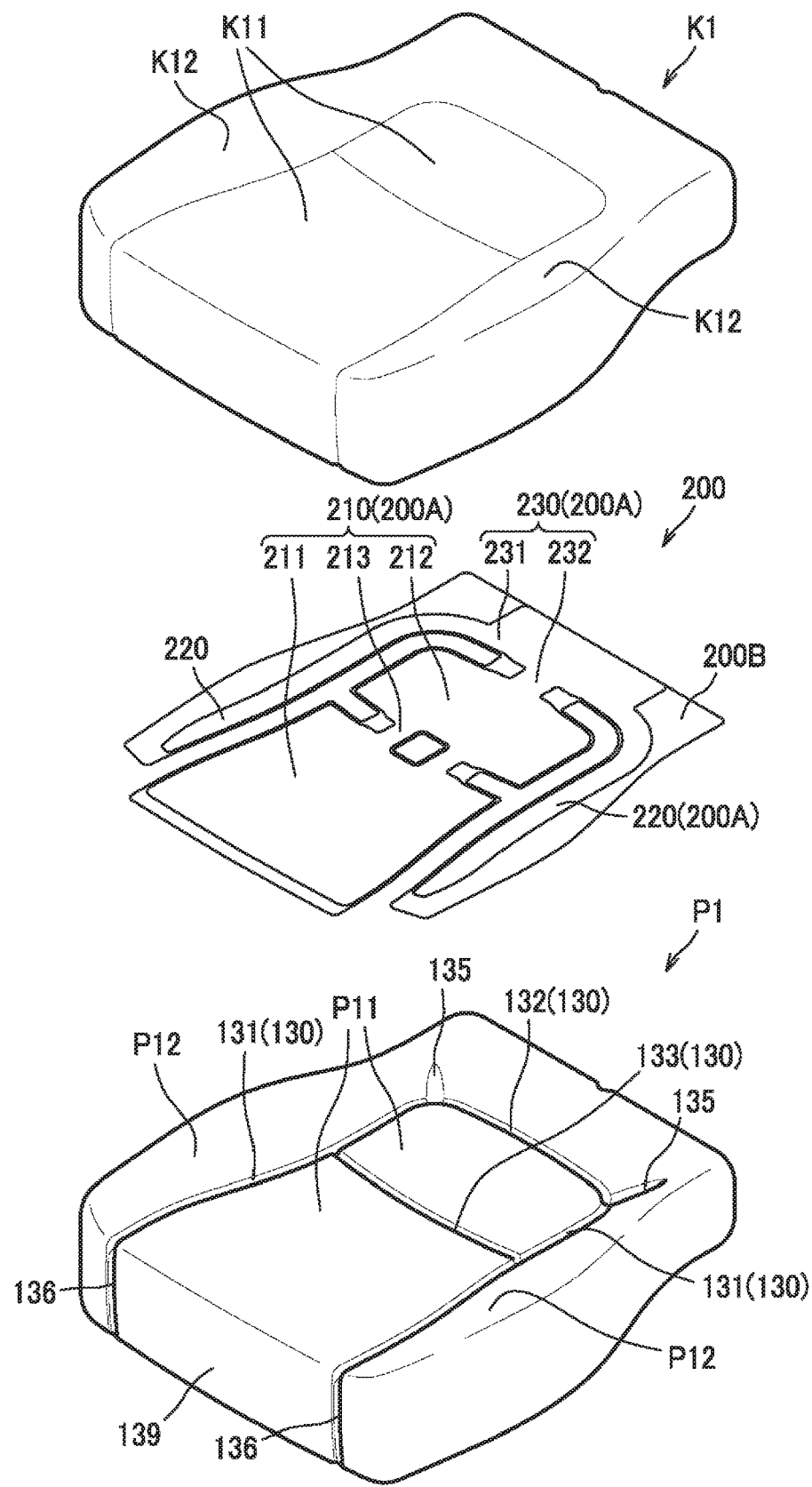
FIG. 10 is an exploded perspective view of a seat cushion pad, a planar heating element and a covering.

As shown in FIG. 10, the seat cushion S1 includes a seat cushion pad P1 as an example of a pad which covers the seat cushion frame F1, a covering K1 which covers the seat cushion pad P1, and a planar heating element 200 sandwiched between the seat cushion pad P1 and the covering K1.

The seat back S2, similar to seat cushion S1, includes a seat back pad P2 (see FIG. 14) as an example of a pad which covers the seat back frame F2, a covering K2 (see FIG. 8) which covers the seat back pad P2, and a planar heating element 300 (see FIG. 14) sandwiched between the seat cushion pad P2 and the covering K2.

The seat cushion pad P1 has a seat surface portion P11 corresponding to the seat surface portion S11 and projecting portions P12 corresponding to the projecting portions S12. Specifically, the seat cushion pad P1 includes a seat surface portion P11 arranged in a laterally central position, and projecting portions P12 arranged on laterally outer sides of the seat surface portion P11 and projecting toward an occupant side so as to support the sides of the occupant. On the top surface of the seat cushion pad P1, a tuck-in groove 130 (131 to 133) is formed into which the covering K1 is tucked in.

The tuck-in groove 130 includes two parting portions 131 arranged between the seat surface portion P11 and the projecting portions P12, which extend in a direction orthogonal to the lateral direction, which is the front-rear direction here, a first lateral groove 132 which connects the rear ends of the two parting portions 131 in the lateral direction, and a second lateral groove 133 which connects the two parting portions 131 in the lateral direction in a position forward of the first lateral groove 132. Further, the seat cushion pad P1 includes, aside from the tuck-in groove 130, shallow grooves 135 which extend diagonally rearwards from the connections of the parting portions 131 and the first lateral groove 132. The shallow grooves 135 are shallower than the tuck-in groove 130 and receives the seam of the covering K1, but the covering K1 will not be tucked into the shallow grooves 135 by C-shaped members, hooks, hook-and-loop fasteners, or the like. The seat cushion pad P1 also has shallow grooves 136 on a front side surface 139 which extend downward from the front end of the parting portions 131. The shallow grooves 136 also receive the seam of the covering K1, but the covering K1 will not be tucked into the shallow grooves 136 by C-shaped members, hooks, hook-and-loop fasteners, or the like.

The planar heating element 200 includes a resistance heating element 200A (210, 220, 230) and a support sheet 200B which supports the resistance heating element 200A.

The resistance heating element 200A, for example, may be a closely-serpentined nichrome wire, a high-resistance metal sheet or a sheet-like or cloth-like carbon. That is, the resistance heating element 200A may have any specific shape or material as long as it is a thin sheet which may be sandwiched between the pad and the covering.

The support sheet 200B is a sheet made of any kind of material, which supports the resistance heating element 200A. For example, the support sheet 200B is a nonwoven fabric. The support sheet 200B may be integral with the resistance heating element 200A, as in the case where resistance heating material is impregnated in the support sheet.

The resistance heating element 200A includes a first heater 210 arranged in the seat surface portion P11, two second heaters 220 arranged in the projecting portions P12, and a connecting portion 230 which connects the first heater 210 and the second heaters 220.

The first heater 210 has a front portion 211 located frontward of the second lateral groove 133, a rear portion 212 located rearward of the second lateral groove 133, and a first heater connecting portion 213 which connects the front portion 211 and the rear portion 212. The first heater connecting portion 213 has a width in the lateral direction smaller than the widths of the front portion 211 and the rear portion 212.

The second heaters 220 each have a shape elongated in the front-rear direction in conformity with the shape of the corresponding projecting portions P12.

The connecting portion 230 connects the rear ends of the second heaters 220 and includes a left-right connecting portion 231 elongated in the lateral direction and a front-rear connecting portion 232 which connects a laterally central portion of the left-right connecting portion 231 and the rear portion 212 of the first heater 210. In this embodiment, the connecting portion 230 is a heater made of a resistance heating wire such as a nichrome wire; however, the connecting portion 230 may be a wiring with low resistance which produces little heat.

Figure 11:
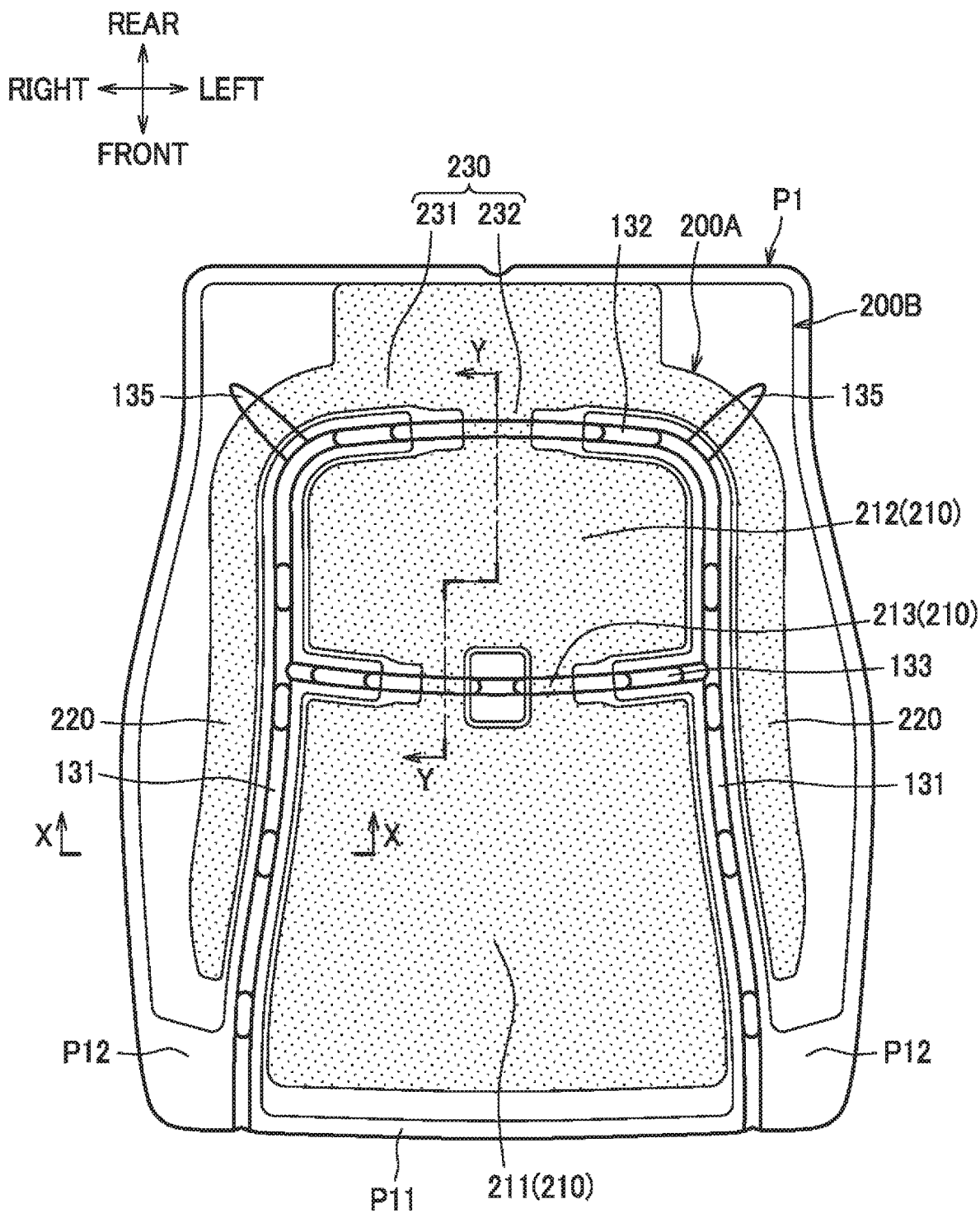
FIG. 11 is a diagram showing the relative positions of the seat cushion pad and the planar heating element.

As shown in FIG. 11, the connecting portion 230 is arranged around the parting portions 131 of the cushion pad P1 and connects the first heater 210 and the second heaters 220. Specifically, the left-right connecting portion 231 of the connecting portion 230 is arranged along the rear side of the parting portions 131 to connect the left and right second heaters 220, and the front-rear connecting portion 232 of the connecting portion 230 is arranged through a gap between the two parting portions 131 to connect the rear portion 212 of the first heater 210 and the left-right connecting portion 231.

Figure 12:
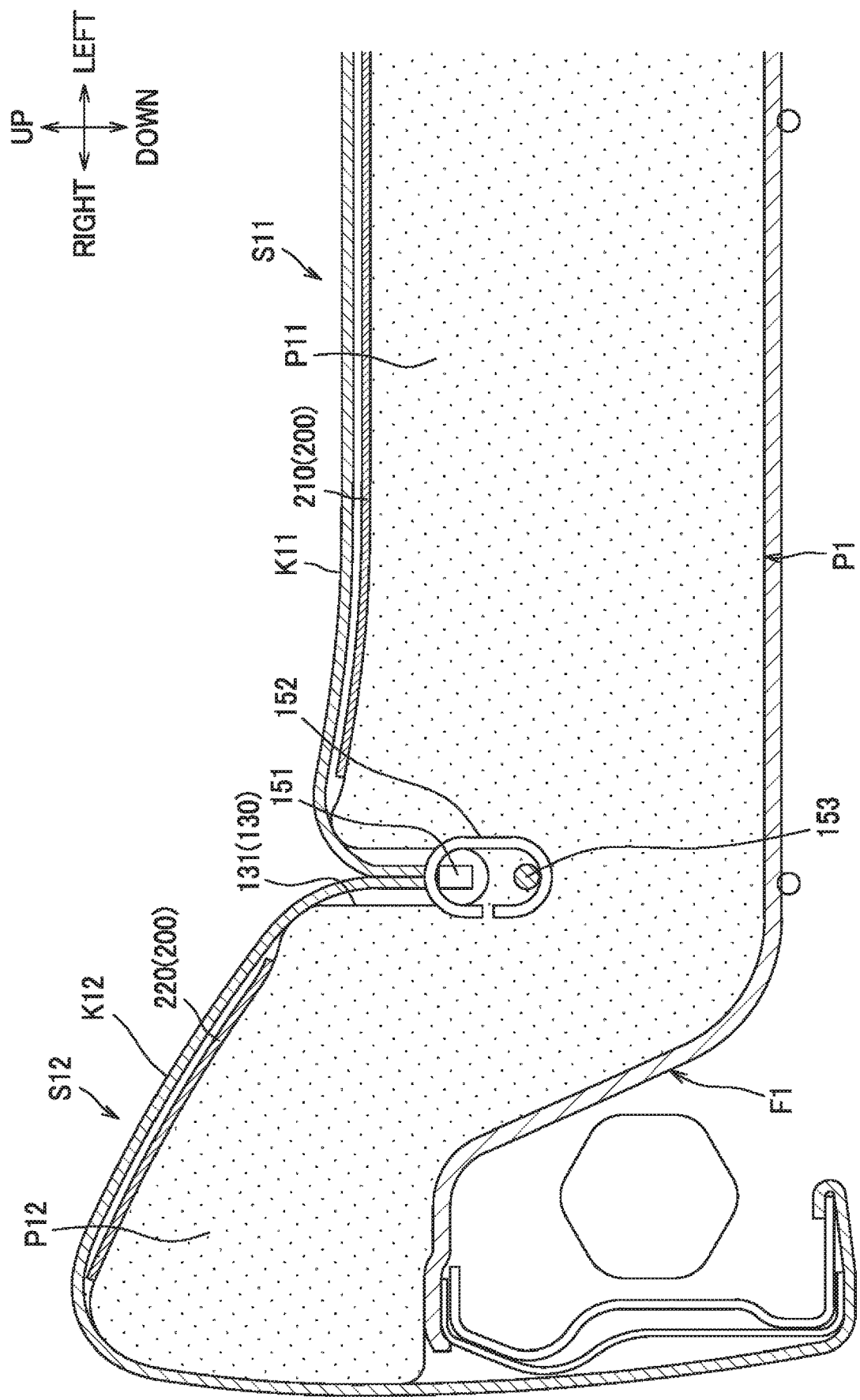
FIG. 12 is a diagram corresponding to the X-X cross section of FIG. 11.

As shown in FIG. 12, a plastic cord 151 is provided in a seam portion between a seat surface portion K11 of the covering K1 corresponding to the seat surface portion S11 and each of projecting portions K12 of the covering K1 corresponding to the projecting portions S12. The plastic cord 151, is for example, seamed together with the material of the seat surface portion K11 and the projecting portions K12.

The plastic cord 151 is provided with attachment members 152 spaced appropriately therealong. The attachment members 152 are C-shaped metal fittings and are hooked onto a metal wire 153 embedded in the seat cushion pad P1. The attachment members 152 may be substituted with hooks or hook-and-loop fasteners. In the case where hook-and-loop fasteners are used, preferably, the hook and loop parts of the fasteners are fixed to opposed surfaces of the metal wire 153 and the plastic cord 151, respectively. In this way, the seam portion of the seat surface portion K11 and the projecting portions K12 of the covering K1 is tucked into the parting portions 131 of the tuck-in groove 130. As mentioned above, since the first heater 210 and the second heaters 220 are arranged around the parting portions 131 and connected to each other, the planar heating element 200 is not positioned in the parting portions 131.

Figure 13:
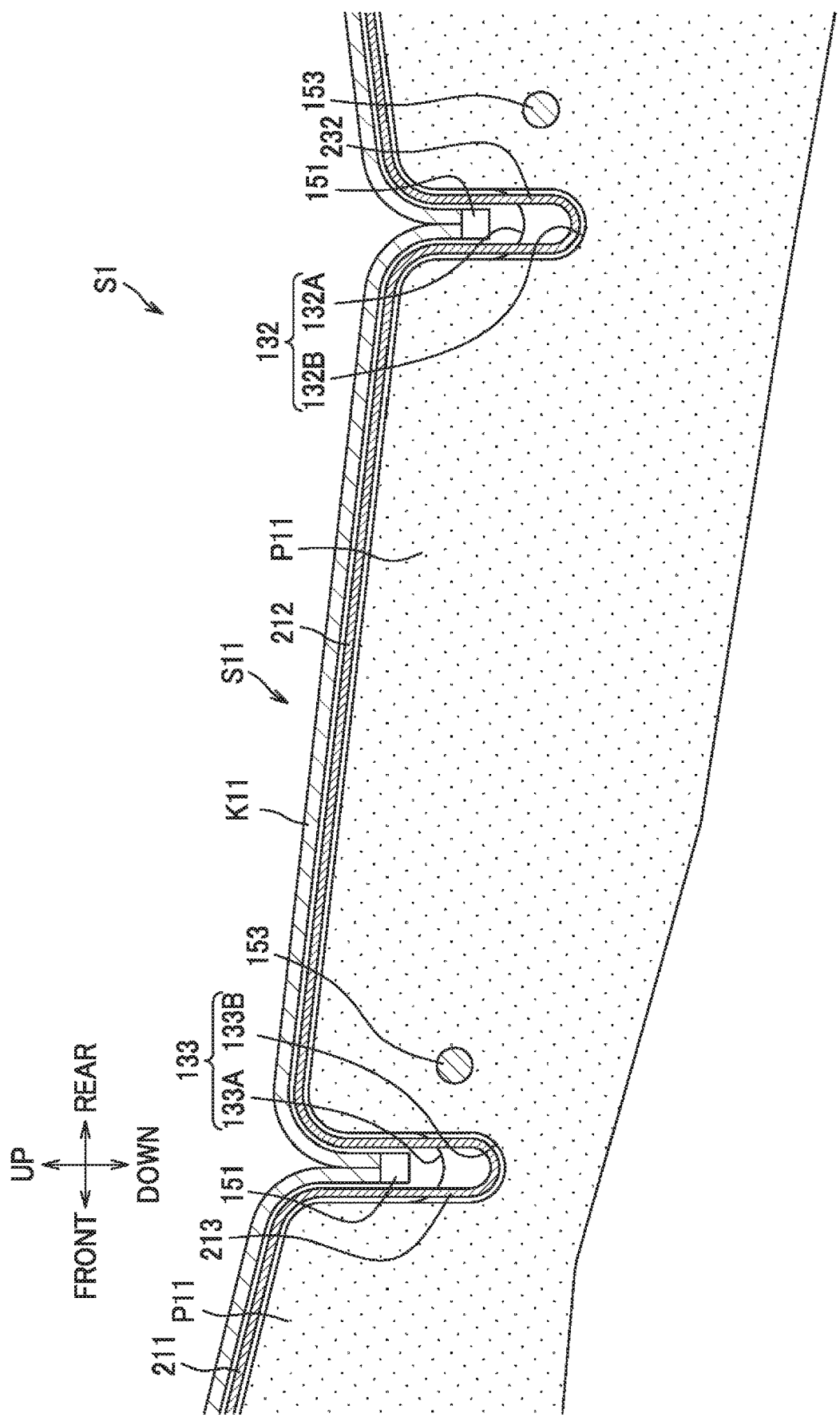
FIG. 13 is a diagram corresponding to the Y-Y cross section of FIG. 11.

As shown in FIG. 13, the first lateral groove 132 of the tuck-in groove 130 of the seat surface portion P11 has a tuck-in groove portion 132A with a depth sufficient to allow a plastic cord 151 to be inserted therein and a deep groove portion 132B formed deeper than the tuck-in groove portion 132A. The front-rear connecting portion 232 is positioned in the deep groove portion 132B. As a result, interference between the front-rear connecting portion 232 and the plastic cord 151 is restrained. Further, when viewed in the cross section in which the deep groove portion 132B is formed, the metal wire 153 is in a position shifted rearward with respect to the deep groove portion 132B such that the metal wire 153 does not affect the front-rear connecting portion 232.

Similarly, the second lateral groove 133 has a tuck-in groove portion 133A with a depth sufficient to allow a plastic cord 151 to be inserted therein and a deep groove portion 133B formed deeper than the tuck-in groove portion 133A. The first heater connecting portion 213 is positioned in the deep groove portion 133B. As a result, interference between the first heater connecting portion 213 and the plastic cord 151 is restrained. Further, when viewed in the cross section in which the deep groove portion 133B is formed, the metal wire 153 is in a position shifted rearward with respect to the deep groove portion 133B such that the metal wire 153 does not affect the first heater connecting portion 213.

Figure 14:
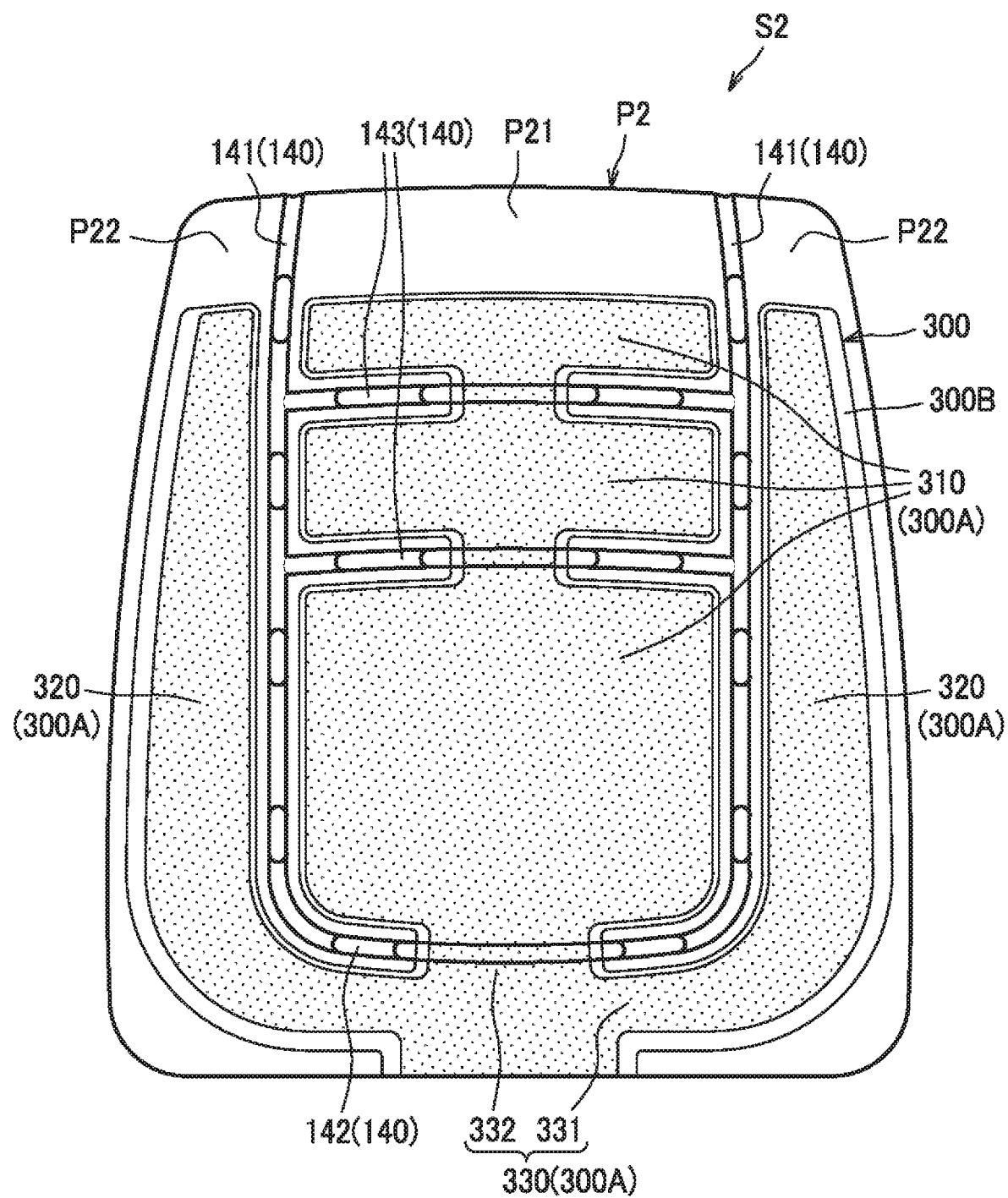
FIG. 14 is a diagram showing the relative positions of a seat back pad and a planar heating element.
Figure 15:
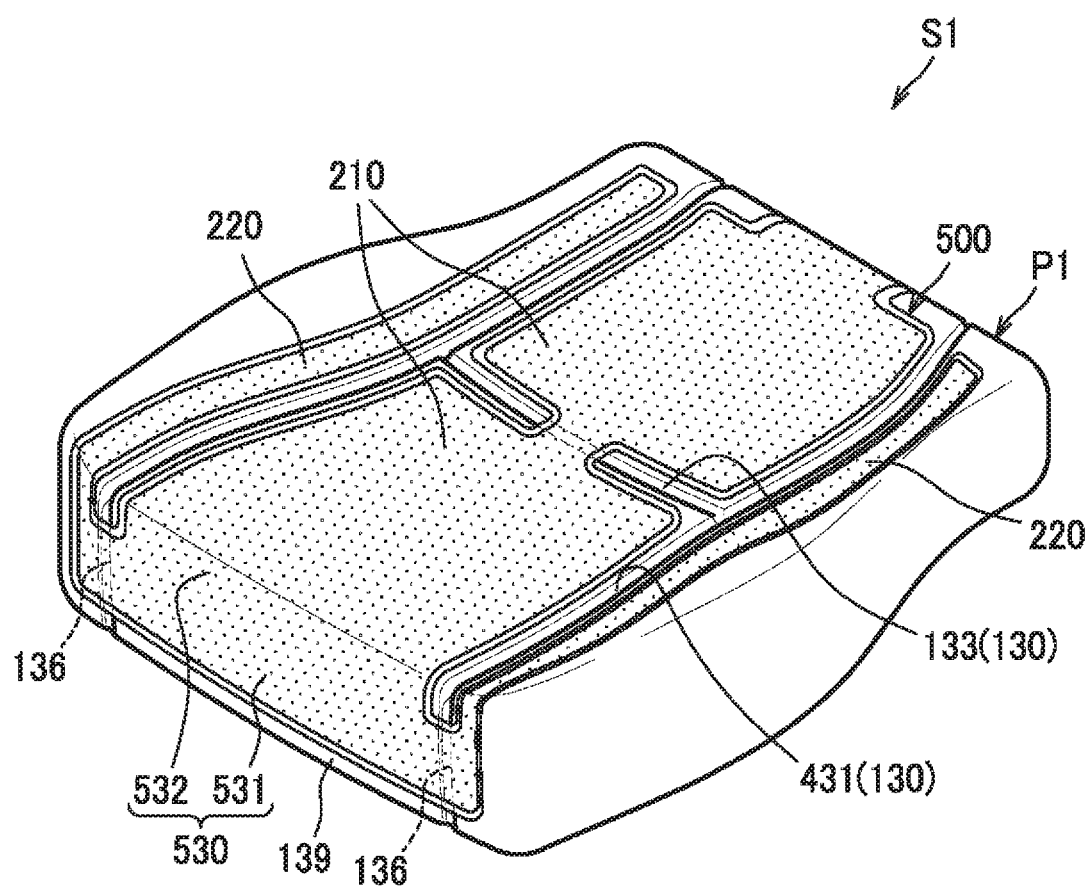
FIG. 15 is a perspective view of a seat cushion pad and a planar heating element according to a second embodiment.
Figure 16:
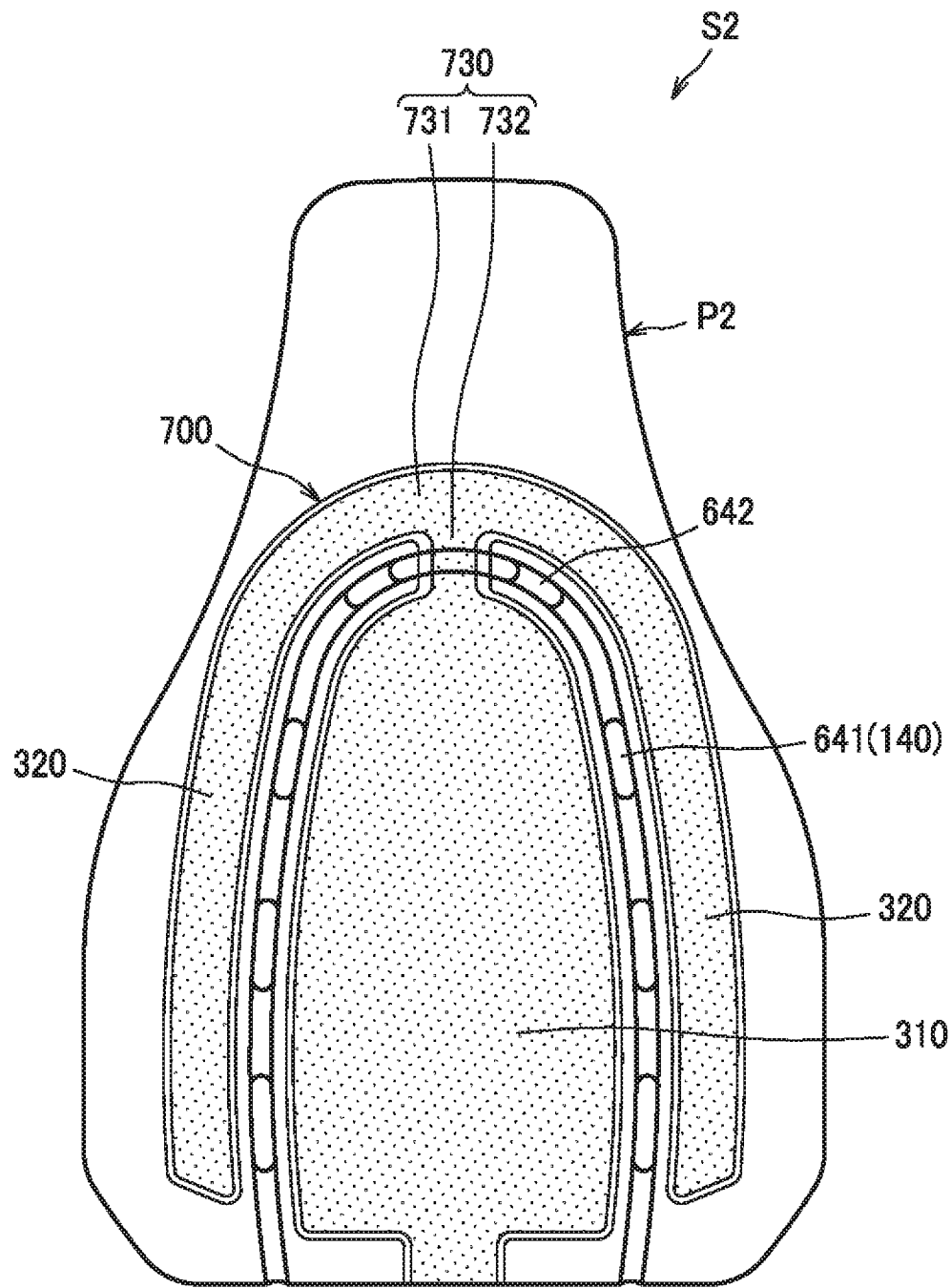
FIG. 16 is a diagram showing a seat back pad and a planar heating element according to a third embodiment.

As shown in FIG. 14, with regard to the seat back S2 as well, the planar heating element 300 is provided in the seat back pad P2 in a manner similar to the seat cushion S1.

The seat back pad P2 includes a seat surface portion P21 arranged in a laterally central position, and projecting portions P22 arranged on laterally outer sides of the seat surface portion P21 and projecting toward an occupant side so as to support the sides of the occupant. In the front surface of the seat back pad P2, a tuck-in groove 140 (141 to 143) is formed in which covering K2 is tucked in.

The tuck-in groove 140 includes two parting portions 141 arranged between the seat surface portion P21 and the projecting portions P22, which extend in a direction orthogonal to the lateral direction, which is the up-down direction here, a first lateral groove 142 which connects the lower ends of the two parting portions 141 in the lateral direction, and two second lateral grooves 143 which connect the two parting portions 141 in the lateral direction in a position higher than that of the first lateral groove 142.

The planar heating element 300 includes a resistance heating element 300A (310, 320, 330) and a support sheet 300B which supports the resistance heating element 300A. The resistance heating element 300A may adopt the same configuration as the resistance heating element 200A and the support sheet 300B may adopt the same configuration as the support sheet 200B.

The resistance heating element 300A, includes a first heater 310 arranged in the seat surface portion P21, two second heaters 320 arranged in the projecting portions P22, and a connecting portion 330 which connects the first heater 310 and the second heaters 320.

The first heater 310 is divided into a plurality of areas similar to the first heater 210 of the seat cushion S1; the connecting portion thereof is positioned in the second lateral grooves 143, but explanation is omitted since the configuration thereof is the same as the seat cushion S1.

The second heaters 320 each have a shape elongated in the up-down direction in conformity with the shape of the corresponding projecting portions P22.

The connecting portion 330 connects the lower ends of the second heaters 320 and includes a left-right connecting portion 331 elongated in the lateral direction and an up-down connecting portion 332 which connects a laterally central portion of the left-right connecting portion 331 and a lower portion of the first heater 310. The connecting portion 330 is arranged around the parting portions 141 of the seat back pad P2 and connects the first heater 310 and the second heaters 320. Specifically, the left-right connecting portion 331 of the connecting portion 330 is arranged under the parting portions 141 and connects the left and right second heaters 320, and the up-down connecting portion 332 of the connecting portion 330 is arranged through a gap between the two parting portions 141 and connects the lower portion of the first heater 310 and the left-right connecting portion 331.

The up-down connecting portion 332 is positioned in a deep groove portion (not shown) formed in the first lateral groove 142, similar to the seat cushion S1.

According to the car seat S configured as above, since the connecting portion 230 connecting the first heater 210 and the second heaters 220 in the seat cushion S1 is arranged around the parting portions 131 of the tuck-in groove 130, specifically along the rear side of the parting portions 131, the planar heating element 200 is less susceptible to damage while having a simple structure.

The front-rear connecting portion 232 of the connecting portion 230 extends across the first lateral groove 132 and is positioned in the deep groove portion 132B; however, this belongs to the conventional art. Since the first lateral groove 132, has a lower possibility of being subject to a large load compared to the parting portions 331, the possibility that the connecting portion 230 will be damaged is low. In the case where the left and right second heaters 220 and the central first heater 210 are connected so as to traverse the parting portions 313 as is conventional, two more structures positioned in a deep groove portion will be necessary; however, since such structure is not necessary in this embodiment, the configuration is made simple.

Further, since the connecting portion 330 connecting the first heater 310 and the second heaters 320 in the seat back S2 is arranged around the parting portions 141 of the tuck-in groove 140, specifically at the underside of the parting portions 141, the planar heating element is less susceptible to damage while having a simple configuration.

Second Embodiment

Next, a second embodiment of the vehicle seat will be described.

In the second embodiment, only parts different from the first embodiment will be explained and parts similar to the first embodiment will be marked with the same reference characters and explanation will be omitted.

In the seat cushion S1 of the car seat of the second embodiment, parting portions 431 of the tuck-in groove 130 extend in the front-rear direction up to the rear end of the seat cushion pad P1.

In addition, a connecting portion 530 of a planar heating element 500 is arranged on a front side surface 139 of the seat cushion pad P1 at the front side of the parting portions 431 to connect the first heater 210 and the second heaters 220. Specifically, the connecting portion 530 has a left-right connecting portion 531 which extends downward from the front end of the second heaters 220 and across shallow grooves 136 on the front surface of the seat cushion pad P1, connecting the two second heaters 220 in the lateral direction, and an up-down connecting portion 532 having the same width as that of the first heater 210 and extending downward from the front end of the first heater 210 to the left-right connecting portion 531. The connecting portion 530 is comprised of a resistance heating element, i.e., a heater.

According to a car seat comprising a seat cushion S1 having such configuration, the first heater 210 and the second heaters 220 can be connected at the front side surface 139 of the seat cushion pad P1 with a simple structure without being subject to a large load. Further, the connecting portion 530 can heat the calves of an occupant and increase comfort.

Third Embodiment

Next, a vehicle seat of a third embodiment will be explained.

In the third embodiment, only parts different from the first embodiment will be explained and parts similar to the first embodiment will be marked with the same reference characters and explanation will be omitted.

In the seat back S2 of the car seat of the third embodiment, parting portions 641 of the tuck-in groove 140 extend in the up-down direction to the lower end of the seat back pad P2. Further, the tuck-in groove 140 includes a lateral groove 642 connecting the upper ends of the parting portions 641 in the lateral direction.

In addition, a connecting portion 730 of a planar heating element 700 is arranged along the upper side of the parting portions 641 to connect the first heater 310 and the second heaters 320. Specifically, connecting portion 730 includes a left-right connecting portion 731 connecting the left and right second heaters 320 in the lateral direction, and an up-down connecting portion 732 connecting the upper end of the first heater 310 and the laterally central portion of the left-right connecting portion 731. The up-down connecting portion 732 transverses the lateral groove 642 and connects the left-right connecting portion 731 and the first heater 310.

According to a car seat comprising the seat back S2 having such configuration, the connecting portion 730 is arranged along the upper side of the parting portions 641 and connects the first heater 310 and the second heaters 320; thus, the first heater 310 and the second heaters 320 can be connected through a portion which is less likely to be subjected to a load.

Although a car seat S as an embodiment of another vehicle seat has been explained above, the vehicle seat of the present disclosure is not limited to the car seat S of the embodiment and the structure thereof can be modified where appropriate.

For example, in the aforementioned embodiment, an independent type seat which is adopted as a driver's seat of an automobile has been given as an example: however, it may be adopted to a bench type seat often adopted as a rear seat of an automobile.

In the embodiment described above, although a car seat of an automobile was given as an example of a vehicle seat, it may be car seat of a rail car or may be configured as a seat for a ship or an aircraft.

In addition, the configurations of each embodiment and each modification described above may be appropriately combined and implemented.

The invention claimed is:

1. A vehicle seat including a seat cushion and a seat back, comprising:
    a first heater which heats a first region of the seat cushion and the seat back;
    a second heater which heats a second region of the seat cushion and the seat back, the second region being different from the first region;
    a controller connected to the first heater and the second heater; and
    a temperature sensor which detects a temperature of the first region,
    wherein the controller is capable of executing PWM control under which current applied to the first heater and the second heater is regulated by setting current-application timeframes within a unit time period,
    wherein a first current-application timeframe that is a period within the unit time period in which current is applied to the first heater and a second current-application timeframe that is a period within the unit time period in which current is applied to the second heater, as set under the PWM control, are shifted relative to each other when current is applied to the first heater and the second heater,
    wherein the controller is configured to:
        execute a first region heating process in which current is provided only to the first heater upon receiving a command to heat the vehicle seat,
        execute, after the first region heating process, a second region heating process in which the first current-application timeframe and the second current-application timeframe are set such that a sum of time periods of the first current-application timeframe and the second current-application timeframe is equal to the unit time period, and
        execute, after the second region heating process, a feedback process in which the first current-application timeframe and the second current-application timeframe are set based on a detected temperature acquired from the temperature sensor, and
    wherein, in the second region heating process, one of the first current-application timeframe or the second current-application timeframe is set to have a duration longer than a duration of the other of the first current-application timeframe and the second current-application timeframe.

2. The vehicle seat according to claim 1, wherein at least one of the seat cushion and the seat back comprises a seat surface portion arranged in a laterally central position and projecting portions arranged on left and right sides of the seat surface portion, the projecting portions projecting toward an occupant side to support sides of an occupant, and
    wherein the first region consists of the seat surface portion and the second region consists of the projecting portions.

3. The vehicle seat according to claim 1, wherein, in the second region heating process, the controller sets the second current-application timeframe to have a duration longer than a duration of the first current-application timeframe.

4. The vehicle seat according to claim 1, wherein, in the second region heating process, the controller sets the first current-application timeframe to have a duration longer than a duration of the second current-application timeframe.

5. The vehicle seat according to claim 1, wherein, in the first region heating process, the controller measures time after receiving the command until the detected temperature reaches a predetermined temperature, and sets an execution time of the second region heating process based on the measured time.

6. The vehicle seat according to claim 1, further comprising:
    a headrest;
    a seat cushion frame; and
    a seat back frame supported by the seat cushion frame;
    wherein the seat cushion, the seat back, and the headrest each comprise a pad material covered with a covering material.

7. A method for manufacturing a vehicle seat according to claim 1, the method comprising:
    arranging the first heater at a seat surface portion;
    arranging the second heater at projecting portions arranged on left and right sides of the seat surface portion;
    covering, with a covering material, a pad material on which the first heater and the second heater are arranged; and
    connecting each of the first heater and the second heater to the controller by a separate wiring.

* * * * *